United States Patent
Ren et al.

(10) Patent No.: US 11,445,786 B2
(45) Date of Patent: Sep. 20, 2022

(54) FASTENING TAPE WITH FLEXIBILITY IN THE LONGITUDINAL DIRECTION AND ASSOCIATED METHODS

(71) Applicant: YKK Corporation, Tokyo (JP)

(72) Inventors: Zhiyu Ren, Macon, GA (US); Tsuyoshi Minato, Macon, GA (US); Atsushi Nakaya, Macon, GA (US); Kenta Okada, Tokyo (JP)

(73) Assignee: YKK Corporation, Tokyo (JP)

( * ) Notice: Subject to any disclaimer, the term of this patent is extended or adjusted under 35 U.S.C. 154(b) by 504 days.

(21) Appl. No.: 16/718,500

(22) Filed: Dec. 18, 2019

(65) Prior Publication Data
US 2020/0121034 A1    Apr. 23, 2020

Related U.S. Application Data

(63) Continuation of application No. 15/154,651, filed on May 13, 2016, now Pat. No. 10,548,374.
(Continued)

(51) Int. Cl.
*A44B 18/00* (2006.01)
*B60N 2/58* (2006.01)
(Continued)

(52) U.S. Cl.
CPC ...... *A44B 18/0049* (2013.01); *A44B 18/0076* (2013.01); *B29C 43/222* (2013.01);
(Continued)

(58) Field of Classification Search
CPC ............ A44B 18/0003; A44B 18/0007; A44B 18/0015; A44B 18/0049; A44B 18/0061;
(Continued)

(56) References Cited

U.S. PATENT DOCUMENTS 5,985,407 A  * 11/1999  Murasaki ........... A44B 18/0049
                                                       24/444
6,106,922 A    8/2000  Cejka et al.
(Continued)

FOREIGN PATENT DOCUMENTS

CN          101053458 A       10/2007
CN          102202539 A        9/2011
(Continued)

OTHER PUBLICATIONS

Office Action, Japanese Patent Application No. 2016-137787, dated Aug. 11, 2020, 8 pages.
(Continued)

*Primary Examiner* — Philip C Tucker
*Assistant Examiner* — Brian R Slawski
(74) *Attorney, Agent, or Firm* — Kilpatrick Townsend & Stockton LLP

(57) ABSTRACT

A fastening tape having flexibility in a longitudinal direction of the fastening tape. The fastening tape includes a plurality of fasteners, a support, and magnetic material positioned on the support. The support defines a plurality of plateaus and a plurality of valleys. The magnetic material is positioned on at least a portion of one of the plurality of plateaus or the plurality of valleys of the support such that a height of the magnetic material varies in the longitudinal direction. Because the height of the magnetic material varies, the fastening tape is more flexible in the longitudinal direction. In some cases, the fastening tape is also flexible in the lateral direction.

6 Claims, 41 Drawing Sheets

Related U.S. Application Data

(60) Provisional application No. 62/212,670, filed on Sep. 1, 2015, provisional application No. 62/193,989, filed on Jul. 17, 2015.

(51) Int. Cl.

| | | |
|---|---|---|
| *B29C 48/00* | (2019.01) | |
| *B29C 48/08* | (2019.01) | |
| *B29C 43/28* | (2006.01) | |
| *B29C 43/22* | (2006.01) | |
| *B29C 43/46* | (2006.01) | |
| *F16B 1/00* | (2006.01) | |
| *B29L 31/00* | (2006.01) | |
| *B29C 65/56* | (2006.01) | |
| *B29C 65/18* | (2006.01) | |
| *B29C 65/72* | (2006.01) | |
| *B29C 65/76* | (2006.01) | |

(52) U.S. Cl.
CPC .............. *B29C 43/28* (2013.01); *B29C 43/46* (2013.01); *B29C 48/0011* (2019.02); *B29C 48/08* (2019.02); *B60N 2/5833* (2013.01); *A44B 18/0061* (2013.01); *B29C 65/18* (2013.01); *B29C 65/56* (2013.01); *B29C 65/72* (2013.01); *B29C 65/76* (2013.01); *B29L 2031/729* (2013.01); *F16B 2001/0028* (2013.01); *F16B 2001/0035* (2013.01); *Y10T 24/27* (2015.01)

(58) Field of Classification Search
CPC ............ A44B 18/0069; A44B 18/0076; A44D 2200/10; A44D 2203/00; B29C 43/222; B29C 43/28; B29C 43/46; B29C 43/464; B29C 48/0011; B29C 48/08; B29C 45/14; B29C 65/18; B29C 65/56; B29C 65/76; B29C 65/72; B29L 2031/729; B60N 2/5833; F16B 2001/002; F16B 2001/003; Y10T 24/27
USPC ........... 156/60, 91, 196, 199, 200, 201, 242, 156/244.11, 244.18, 244.19, 244.27, 245, 156/250, 251, 269, 270, 297, 298, 303.1, 156/308.2, 309.6, 324; 428/99, 100, 119; 24/442; 264/165, 167, 212, 214, 216, 264/145
See application file for complete search history.

(56) References Cited

U.S. PATENT DOCUMENTS

| | | |
|---|---|---|
| 6,656,563 B1 | 12/2003 | Leach et al. |
| 6,720,059 B2 | 4/2004 | Fujisawa et al. |
| 6,896,759 B2 | 5/2005 | Fujisawa et al. |
| 7,022,394 B2 | 4/2006 | Fujisawa et al. |
| 7,971,325 B2 | 7/2011 | Line et al. |
| 8,756,770 B2 | 6/2014 | Cina et al. |
| 9,034,452 B2 | 5/2015 | Cina et al. |
| 9,138,032 B1 | 9/2015 | Cina et al. |
| 9,271,547 B2 | 3/2016 | Terada et al. |
| 9,357,815 B2 | 6/2016 | Minato et al. |
| 9,635,910 B2 | 5/2017 | Cina et al. |
| 10,189,387 B2 | 1/2019 | Ren et al. |
| 2001/0038161 A1* | 11/2001 | Kenney .............. B29C 48/0014 264/177.17 |
| 2002/0164449 A1 | 11/2002 | Fujisawa et al. |
| 2002/0164451 A1 | 11/2002 | Fujisawa et al. |
| 2003/0214068 A1 | 11/2003 | Fujisawa et al. |
| 2007/0240289 A1 | 10/2007 | Murasaki et al. |
| 2009/0300890 A1 | 12/2009 | Coronel et al. |
| 2010/0181695 A1 | 7/2010 | Murasaki et al. |
| 2011/0062615 A1 | 3/2011 | Murasaki et al. |
| 2011/0197404 A1 | 8/2011 | Terada et al. |
| 2013/0167332 A1 | 7/2013 | Terada et al. |
| 2013/0340214 A1 | 12/2013 | Terada et al. |
| 2014/0130311 A1 | 5/2014 | Okuda et al. |
| 2014/0298626 A1 | 10/2014 | Murasaki et al. |
| 2014/0298628 A1 | 10/2014 | Minato et al. |
| 2015/0164186 A1 | 6/2015 | Cina et al. |
| 2015/0335106 A1 | 11/2015 | Okuda et al. |
| 2016/0023386 A1 | 1/2016 | Terada et al. |
| 2016/0242512 A1 | 8/2016 | Minato et al. |
| 2017/0013918 A1 | 1/2017 | Ren et al. |
| 2017/0295890 A1 | 10/2017 | Imai et al. |
| 2018/0271229 A1 | 9/2018 | Terada et al. |

FOREIGN PATENT DOCUMENTS

| | | |
|---|---|---|
| CN | 103079422 A | 5/2013 |
| CN | 103350531 A | 10/2013 |
| CN | 103415226 A | 11/2013 |
| CN | 104053376 A | 9/2014 |
| JP | H06-064825 U | 9/1994 |
| JP | 2001260150 | 9/2001 |
| JP | 3886971 | 2/2007 |
| JP | 4439118 | 3/2010 |
| JP | 2013252453 | 12/2013 |
| JP | 5496339 | 5/2014 |
| KR | 2004-0048927 A | 6/2004 |
| WO | 2010052779 | 5/2010 |
| WO | 2012120618 | 9/2012 |
| WO | 2014/106896 A1 | 7/2014 |

OTHER PUBLICATIONS

*U.S. Appl. No. 15/154,651 , "Final Office Action", dated Jul. 12, 2018, 15 pages.
*U.S. Appl. No. 15/154,651 , "Final Office Action", dated Mar. 16, 2018, 15 pages.
*U.S. Appl. No. 15/154,651 , "Final Office Action", dated Oct. 31, 2018, 18 pages.
*U.S. Appl. No. 15/154,651 , "Non-Final Office Action", dated Apr. 3, 2019, 16 pages.
*U.S. Appl. No. 15/154,651 , "Non-Final Office Action", dated Aug. 11, 2017, 16 pages.
*U.S. Appl. No. 15/154,651 , "Notice of Allowance", dated Sep. 19, 2019, 7 pages.
*U.S. Appl. No. 15/154,651 , "Restriction Requirement", dated May 1, 2017, 7 pages.
U.S. Appl. No. 15/154,676 , "Non-Final Office Action", dated Mar. 9, 2018, 7 pages.
U.S. Appl. No. 15/154,676 , "Notice of Allowance", dated Sep. 14, 2018, 5 pages.
Chinese Patent Application No. 201610556999.7 , Office Action, dated Oct. 19, 2018, 15 pages.
Korean Patent Application No. 2016-0089764 , Office Action, dated Nov. 21, 2017, 25 pages.

* cited by examiner

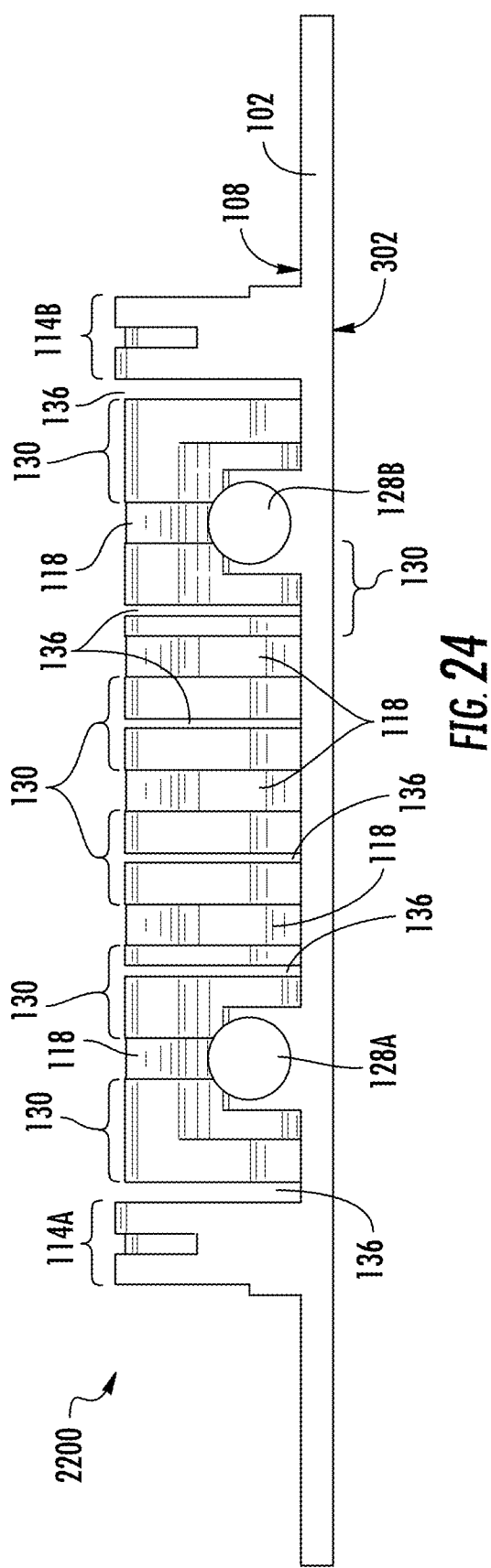
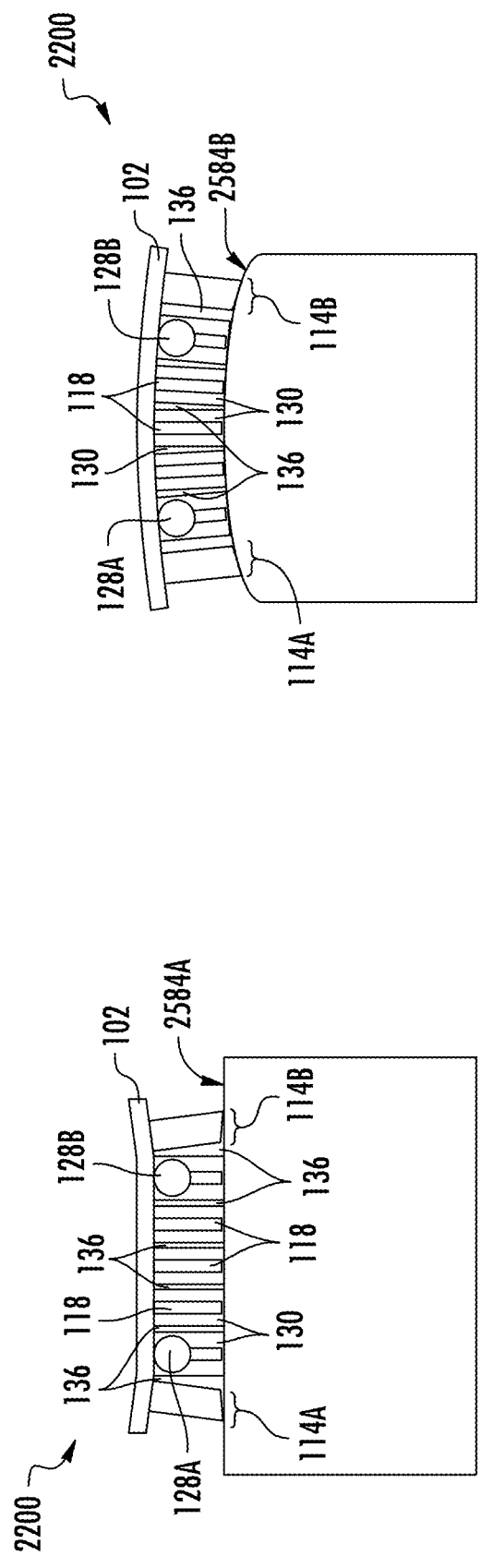

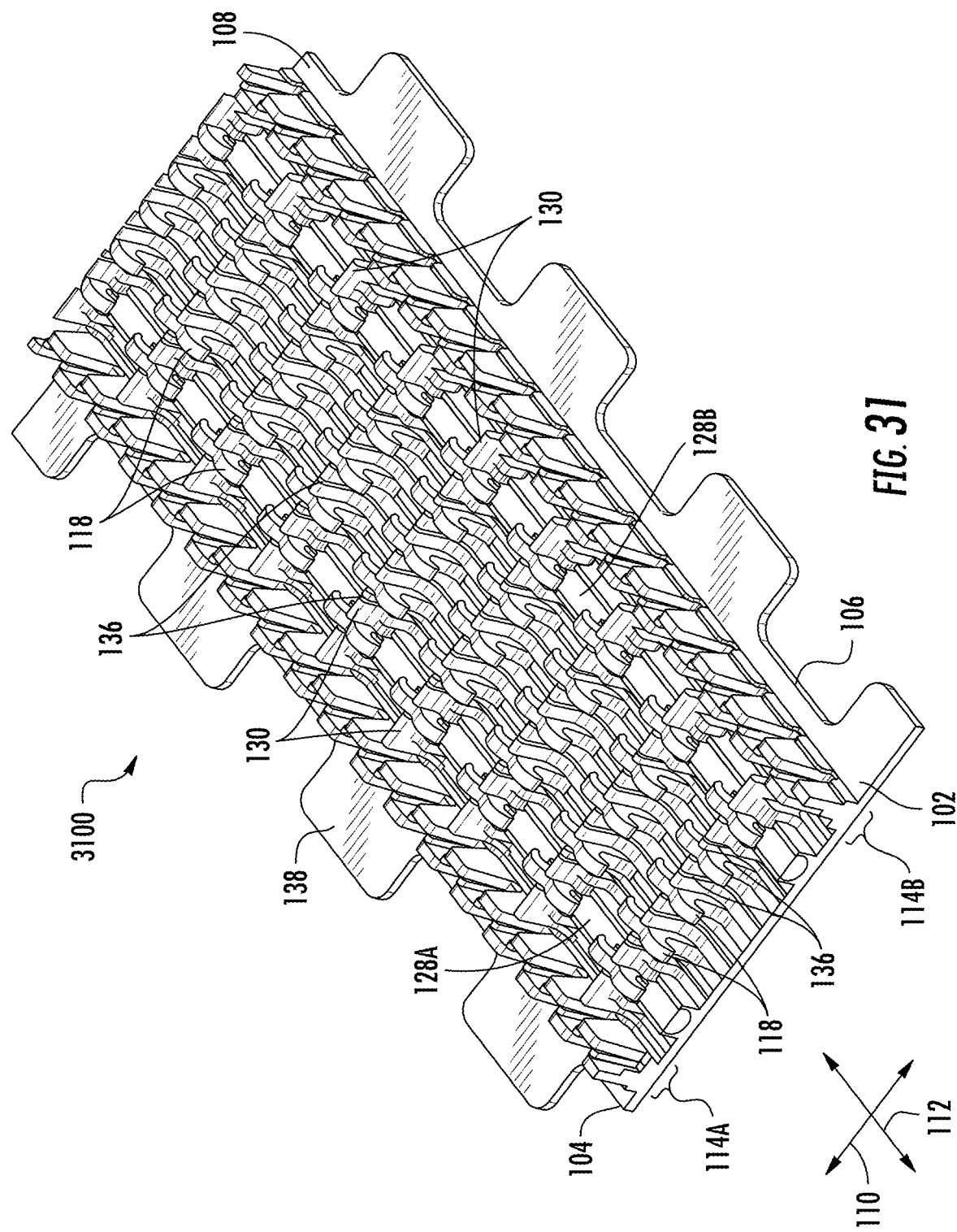

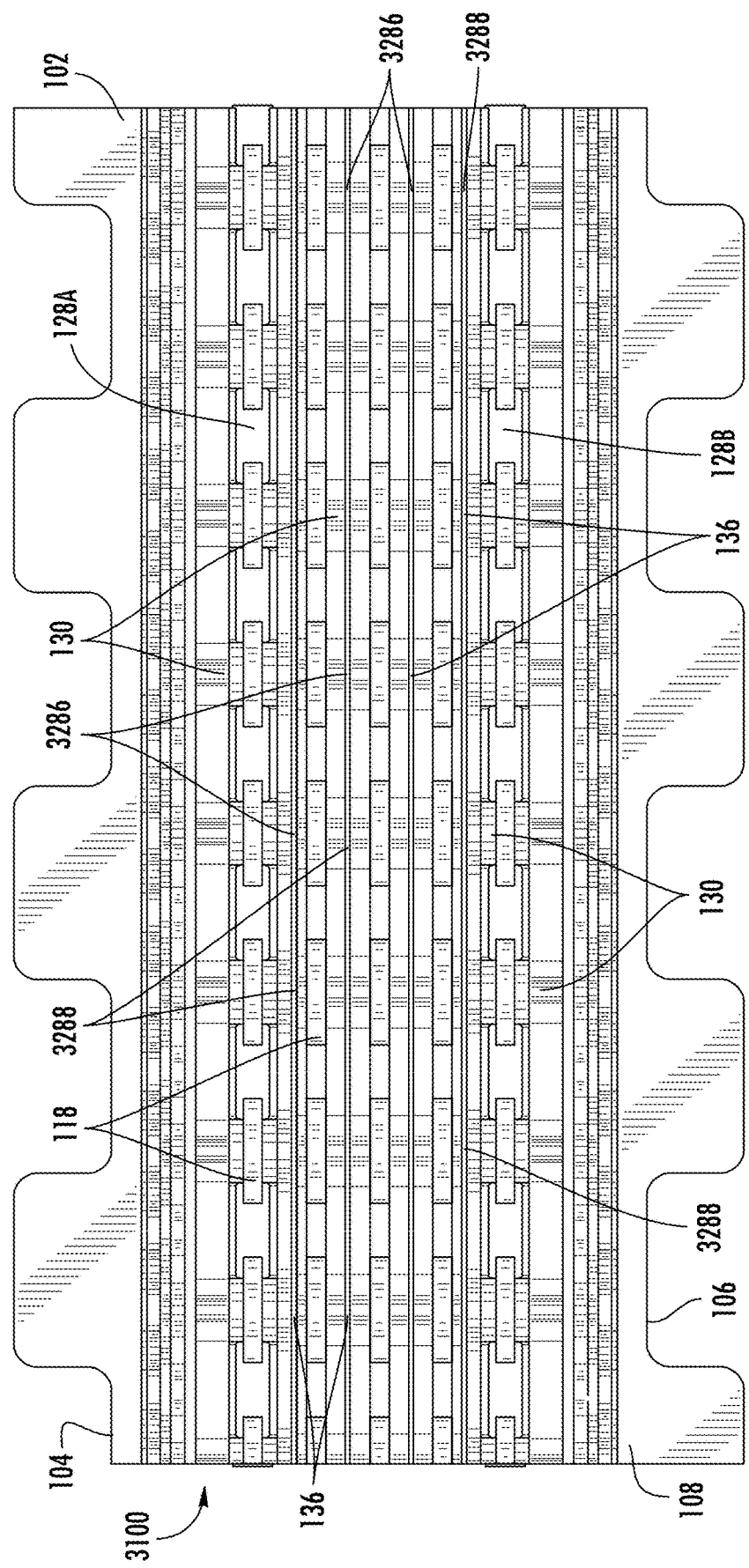

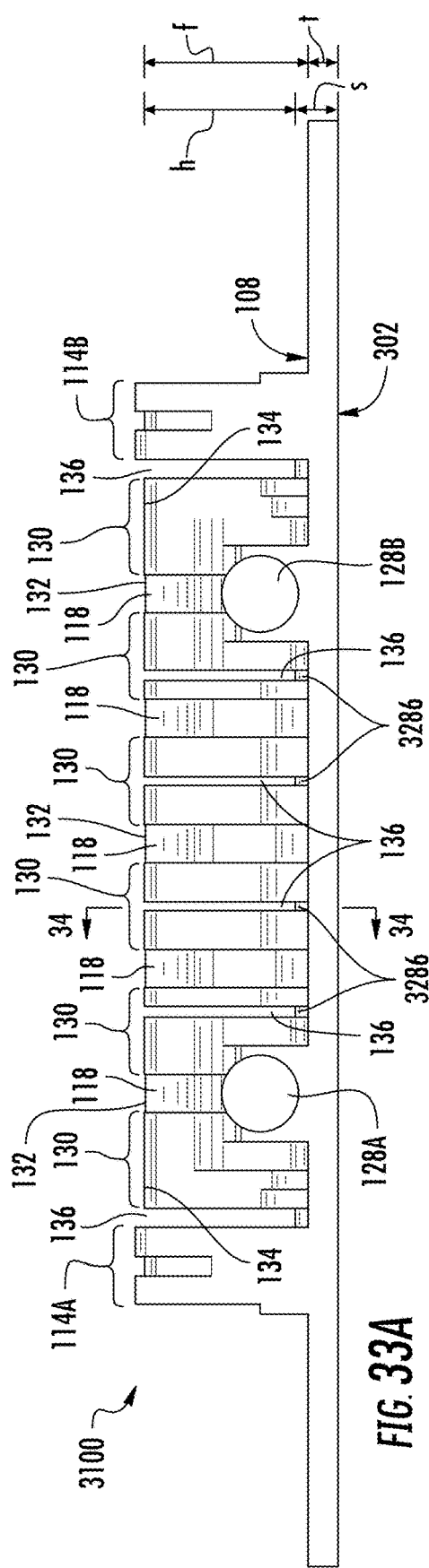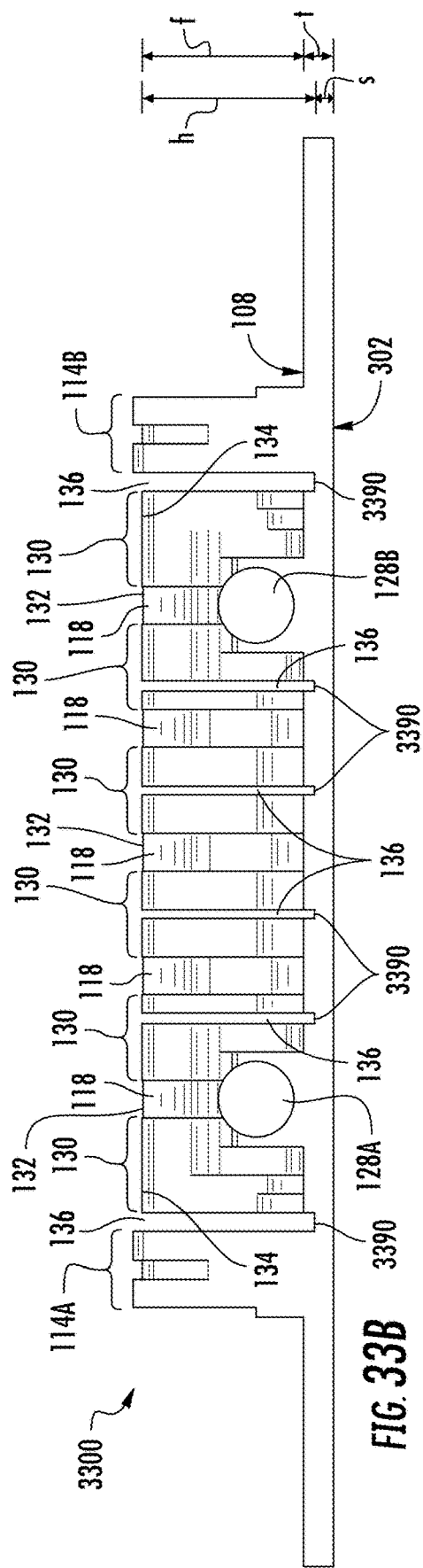

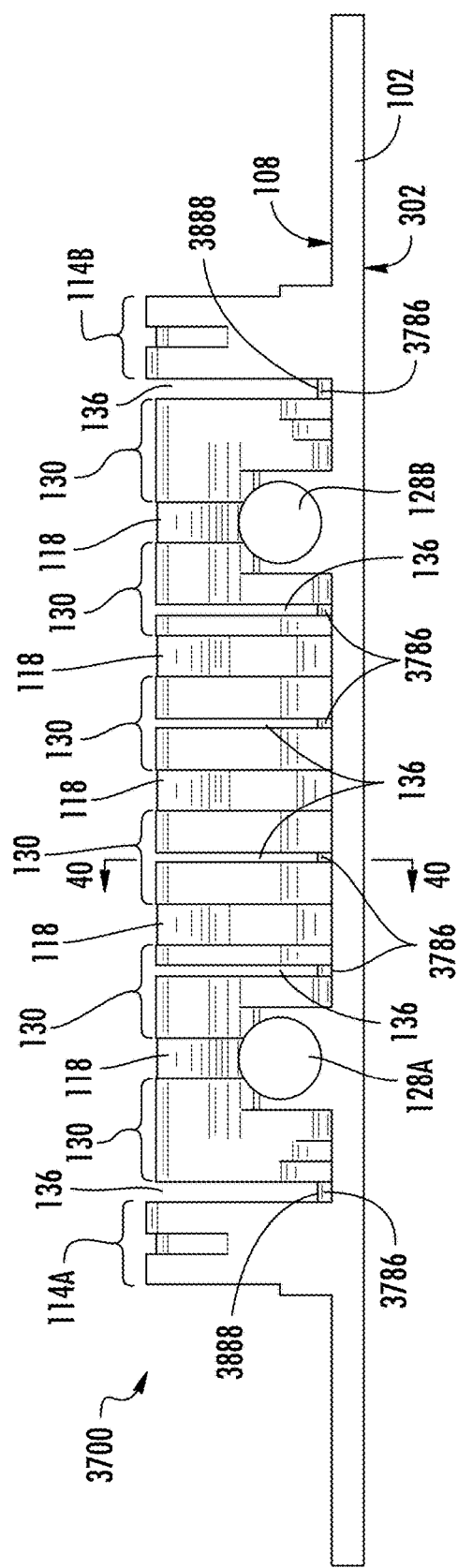
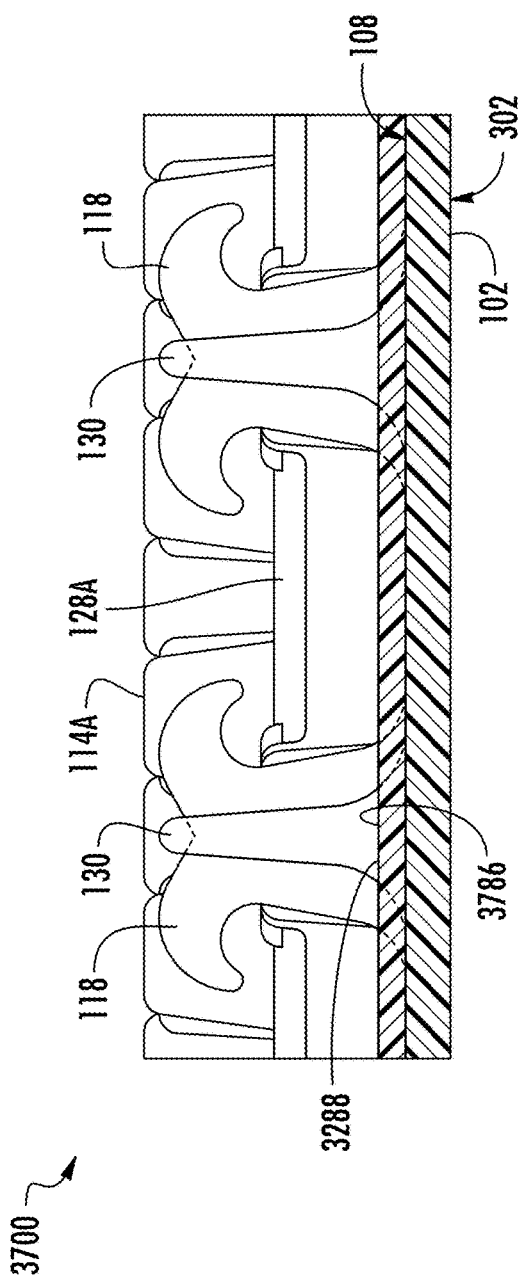
FIG. 39
FIG. 40

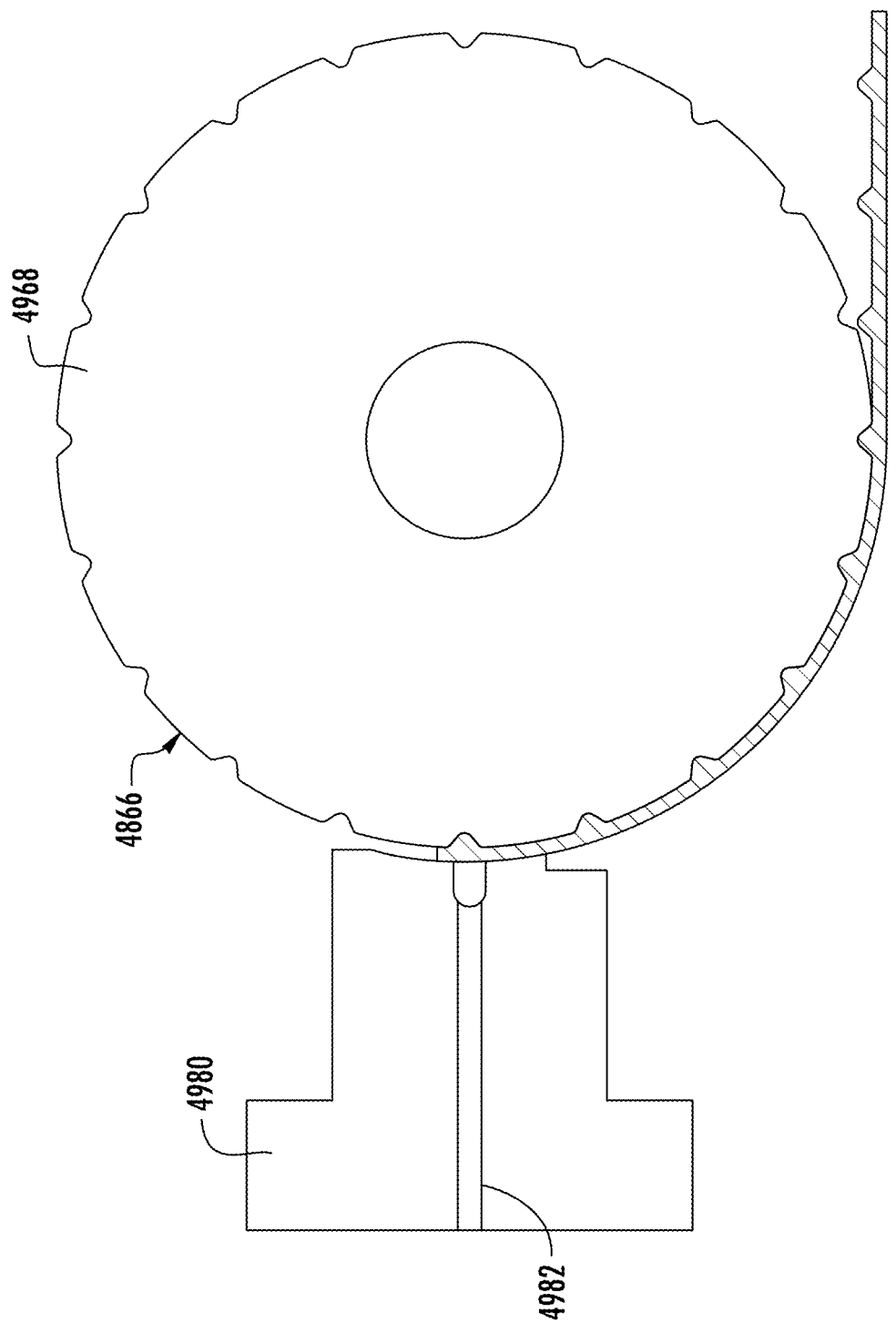

FASTENING TAPE WITH FLEXIBILITY IN THE LONGITUDINAL DIRECTION AND ASSOCIATED METHODS

REFERENCE TO RELATED APPLICATIONS

This application is a continuation application of U.S. patent application Ser. No. 15/154,651, filed May 13, 2016 and entitled "Fastening Tape With Flexibility in the Longitudinal Direction and Associated Methods" which claims the benefit of U.S. Provisional Application No. 62/193,989, filed Jul. 17, 2015 and entitled "Hook Fastening Tape with Flexibility in the Width Direction," and U.S. Provisional Application No. 62/212,670, filed Sep. 1, 2015 and entitled "Hook Fastening Tape with Flexibility in the Longitudinal Direction and Associated Methods," all of which are hereby incorporated by reference in their entireties.

BACKGROUND

Technical Field

The application relates to fastening tape and methods of forming fastening tape.

Background Technology

Fastening tape used in automotive and other applications may be installed on a seat cushion or other component by first placing the fastening tape on a trench within a mold. After the fastening tape has been situated, urethane foam is introduced, which forms the seat cushion or other component around the fastening tape. If foam intrudes into the fastening tape, the fasteners, such as hooks, of the fastening tape are more prone to failure. If the trench surface on which the fastening tape is positioned is curved instead of planar, foam intrusion is more likely.

SUMMARY

The term embodiment and like terms are intended to refer broadly to all of the subject matter of this disclosure. Statements containing these terms should be understood not to limit the subject matter described herein. This summary is a high-level overview of various aspects of the disclosure and introduces some of the concepts that are further described in the Detailed Description section below. This summary is not intended to identify key or essential features, nor is it intended to be used in isolation.

Disclosed are fastening tapes with increased flexibility in the longitudinal direction to make the tapes easier to bend and/or twist. In some cases, the fastening tape also has increased flexibility in the lateral direction. Also disclosed are methods of making of such tapes. Fastening tape with improved flexibility may better conform to the shape of the surface on which it is placed, including trenches with rounded or curved surfaces, to help reduce the intrusion of foam.

In one aspect, a fastening tape includes a body having a first edge, a second edge distal from the first edge, and a top surface extending between the first edge and the second edge. The body defines a lateral direction from the first edge to the second edge and a longitudinal direction transverse to the lateral direction. The fastening tape also includes a plurality of fasteners extending in an upward direction from the top surface of the body and arranged in rows extending in the lateral direction of the body. The fastening tape further includes a support extending in the upward direction from the top surface of the body and extending in the longitudinal direction. The support defines a support top surface having a plurality of plateaus and valleys. A height of each of the plurality of plateaus is greater than a height of each of the plurality of valleys. A magnetic material is positioned on at least a portion of one of the plurality of plateaus or a portion of one of the plurality of valleys of the support top surface.

In some cases, the fastening tape includes a plurality of transverse walls extending in the upward direction from the top surface of the body. The transverse walls are arranged in rows extending in the lateral direction along the body and some of the plurality of transverse walls connect fasteners of one of the rows of the plurality of fasteners and the support. Moreover, in some cases, the fastening tape includes at least one slit within or adjacent at least one of the transverse walls. The at least one slit extends from a topmost end of the transverse wall towards the top surface of the body and has a slit width that is less than the transverse wall width. In a further aspect, at least some of the plurality of transverse walls connect fasteners of the rows of the plurality of fasteners.

Various implementations described in the present disclosure can include additional systems, methods, features, and advantages that are not necessarily expressly disclosed herein, but will be apparent to one of ordinary skill in the art upon examination of the following detailed description and accompanying drawings. All such systems, methods, features, and advantages are included within the present disclosure and protected by the accompanying claims.

BRIEF DESCRIPTION OF THE DRAWINGS

Illustrative embodiments of the present disclosure are described in detail below with reference to the following drawing figures:

FIG. 24 is an end view of the segment of fastening tape of FIG. 22.

FIG. 25A is an end view of the segment of fastening tape of FIG. 22 on a flat trench surface.

FIG. 25B is an end view of the segment of fastening tape of FIG. 22 on a curved trench surface.

FIG. 31 is a top perspective view of a segment of fastening tape according to an aspect of the current disclosure.

FIG. 32 is a top view of the segment of fastening tape of FIG. 31.

FIG. 33A is an end view of the segment of fastening tape of FIG. 31.

FIG. 33B is an end view of a segment of fastening tape according to an aspect of the current disclosure.

FIG. 39 is an end view of the segment of fastening tape of FIG. 37.

FIG. 40 is a sectional view of the segment of fastening tape of FIG. 37 taken along line 40-40 in FIG. 39.

FIG. 49 is a side view of an exemplary extrusion process for forming the fastening tape of FIG. 22 according to an aspect of the current disclosure.

DETAILED DESCRIPTION

Figure 1:
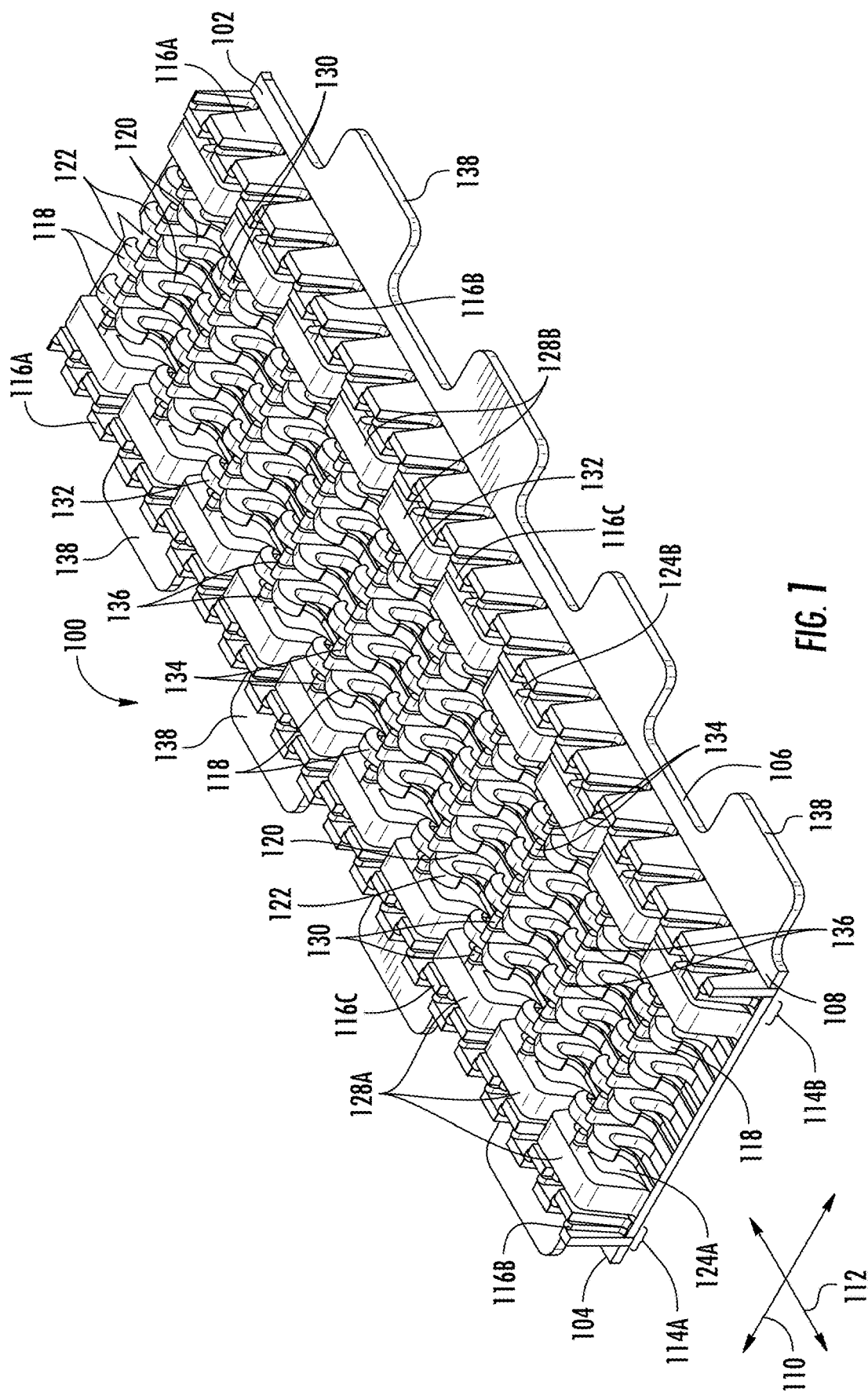
FIG. 1 is a top perspective view of a segment of fastening tape according to an aspect of the current disclosure.

The subject matter of aspects and examples of the present invention is described here with specificity to meet statutory requirements, but this description is not necessarily intended to be limiting. The described subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The following description is provided as an enabling teaching of the invention. To this end, those of ordinary skill in the relevant art will recognize and appreciate that many changes can be made to the various aspects of the invention described herein, while still obtaining the beneficial results of the invention. It will also be apparent that some of the desired benefits can be obtained by selecting some of the features of the invention without utilizing other features. Accordingly, those who work in the art will recognize that many modifications and adaptations to the invention are possible and can even be desirable in certain circumstances and are a part of the invention. Thus, the following description is provided as illustrative of the principles of the invention and not in limitation thereof.

As used throughout, the singular forms "a," "an" and "the" include plural referents unless the context clearly dictates otherwise. Thus, for example, reference to "a fastener" can include two or more such fasteners unless the context indicates otherwise.

Ranges can be expressed herein as from "about" one particular value and/or to "about" another particular value. When such a range is expressed, another aspect includes from the one particular value and/or to the other particular value. Similarly, when values are expressed as approximations, by use of the antecedent "about," the particular value forms another aspect. Moreover, the endpoints of each of the ranges are significant both in relation to the other endpoint, and independently of the other endpoint.

As used herein, the terms "optional" or "optionally" mean that the subsequently described event or circumstance can or can not occur, and that the description includes instances where said event or circumstance occurs and instances where it does not.

The word "or" as used herein means any one member of a particular list and also includes any combination of members of that list. Further, conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects. Directional references such as "up," "down," "top," "left," "right," "front," "back," and "corners," among others, are intended to refer to the orientation as illustrated and described in the figure (or figures) to which the components and directions are referencing.

Disclosed are fastening tapes and associated methods, systems, devices, and various apparatuses. In one aspect, a fastening tape has a body, sidewalls, a plurality of fasteners such as hooks, and transverse walls. In some aspects, the fastening tape includes supports.

Figure 2:
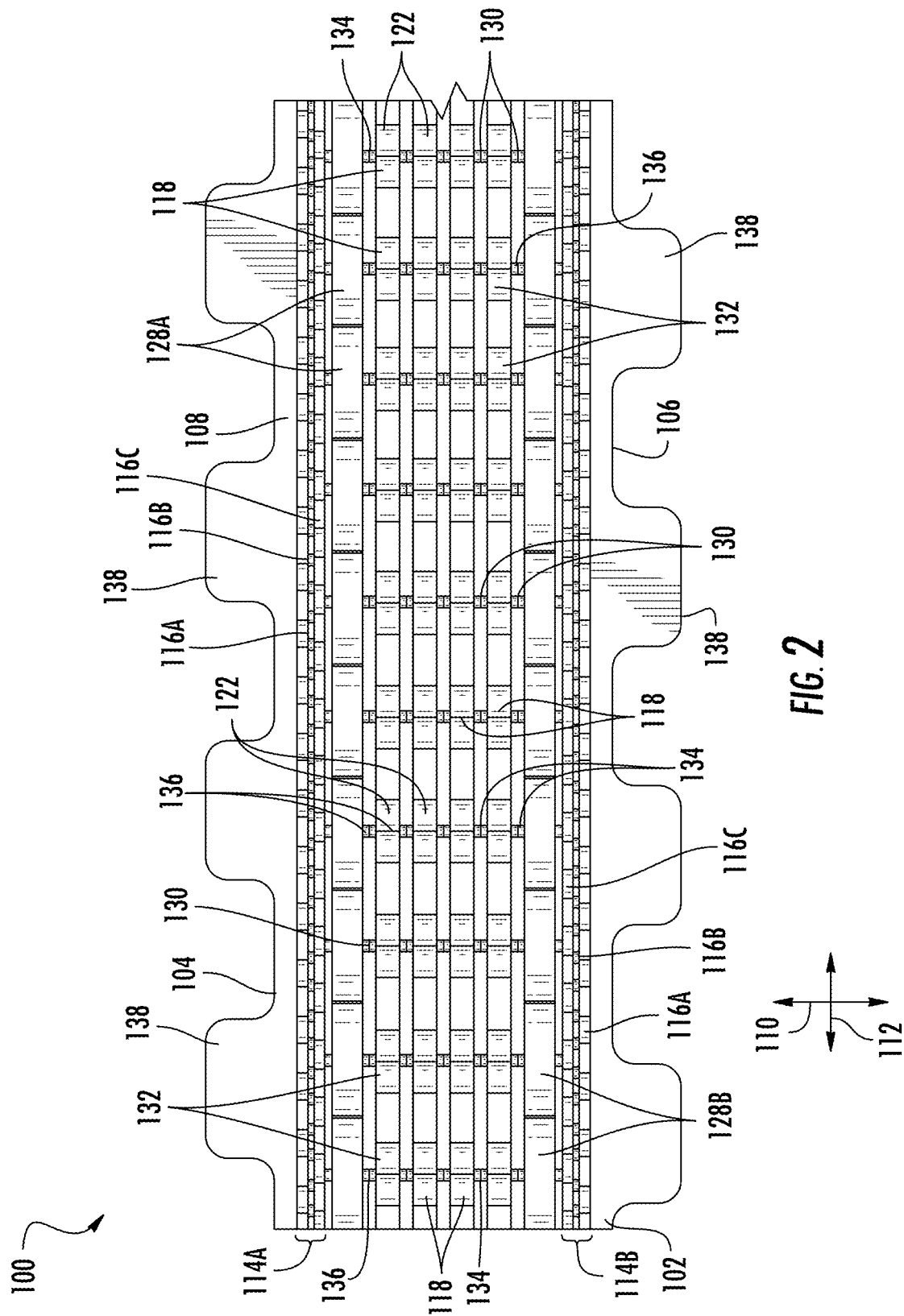
FIG. 2 is a top view of the segment of fastening tape of FIG. 1.
Figure 3:
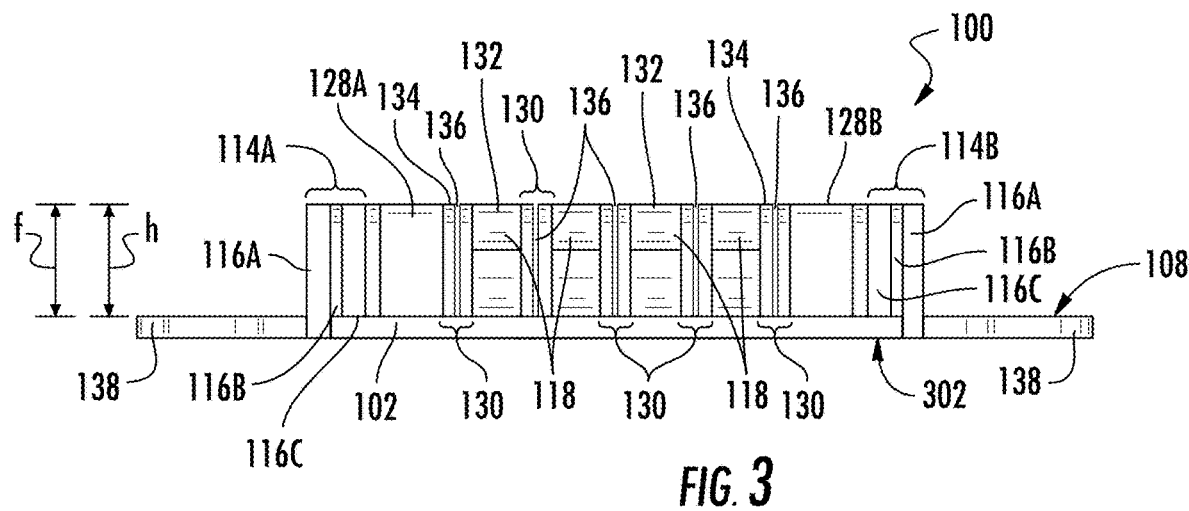
FIG. 3 is an end view of the segment of fastening tape of FIG. 1.

Referring to FIGS. 1-3, a fastening tape 100 includes a body 102 having a first edge 104 and a second edge 106 distal from the first edge 104. The body 102 further includes a top surface 108 and a bottom surface 302 (FIG. 3), each extending between the first edge 104 and the second edge 106. The body 102 defines a lateral direction 110, which can be a direction extending from the first edge 104 to the second edge 106, and a longitudinal direction 112, which extends transversely to the lateral direction 110. Optionally, as shown in FIGS. 1 and 2, in some aspects, the fastening tape 100 has tabs 138 extending outwardly from the first edge 104 and second edge 106, respectively.

As shown in FIGS. 1-3, the fastening tape 100 includes sidewalls 114A,B. The sidewalls 114A,B extend in an upward direction from the top surface 108, and extend along the top surface 108 of the body 102 in the longitudinal direction 112. As illustrated in FIGS. 1-3, in one non-limiting example, the sidewall 114A is positioned proximate to the first edge 104 and the sidewall 114B is positioned proximate to the second edge 106.

In some aspects, each sidewall 114A,B includes sidewall components 116A-C. Although three sidewall components are illustrated, any number of sidewall components 116 can be present in each sidewall 114A,B, respectively, including one or more sidewall components. As illustrated in FIGS. 1-3, each sidewall component 116A-C extends in the upward direction from the top surface 108 and includes a plurality of plateaus and valleys. The plateaus and valleys may be present at regular or irregular intervals. The sidewall components 116 can have various-shaped profiles and are not limited to the illustrated arrangement. In some cases, the sidewall components 116A-C do not have a plurality of plateaus and valleys. As illustrated in FIGS. 1 and 2, in some aspects, a plateau of one sidewall component is aligned with a valley of an adjacent sidewall component. The sidewalls 114A,B are arranged to act as a barrier to reduce the amount of foam intrusion into the space between the sidewalls 114A,B during a molding process.

As illustrated, the fastening tape 100 also has a plurality of fasteners 118 extending in the upward direction from the top surface 108 of the body 102. As shown in FIGS. 1-3, the fasteners 118 are positioned between the sidewalls 114A,B. Any suitable number of fasteners 118, including at least one fastener, may extend from the fastening tape 100. Each fastener 118 has a stem portion 120 and an attachment portion 122. In one example, the attachment portion 122 is a hook. Fasteners 118 can have any suitable shape and configuration, including generally Y-shaped, J-shaped, etc. Each fastener 118 defines a fastener height f (illustrated, for example, in FIGS. 3, 33A, 33B, and 34), which is a distance from the top surface 108 of the body 102 to a topmost end 132 of the fastener 118.

As illustrated in FIGS. 1 and 2, the fasteners 118 are arranged in rows that extend in the lateral direction 110 between the sidewalls 114A,B. In the illustrated example, each row of fasteners 118 includes four fasteners 118, however any suitable number of fasteners 118 can be present per row. Moreover, a width of the fastening tape 100, which is a distance from the first edge 104 to the second edge 106, can be adjusted as desired. For example, additional or fewer fasteners 118 may be present across the width of the fastening tape 100 depending on the width of the fastening tape 100.

As further illustrated in FIGS. 1-3, the fastening tape 100 includes supports 124A,B extending in the upward direction from the top surface 108 of the body 102 in the longitudinal direction 112. Any suitable number of supports 124 can be present, and in some cases, the fastening tape 100 does not include any supports 124. FIGS. 1-3 illustrate the support 124A as positioned between the sidewall 114A and the fasteners 118 and support 124B as positioned between the sidewall 114B and the fasteners 118. In this example, the fasteners 118 are positioned on the body 102 between the supports 124A,B. In other examples, the supports 124A,B can be positioned at various other locations on the body 102, including, but not limited to, between the sidewalls 114A,B and the edges 104,106, respectively, in the middle of the fastening tape 100, or various other locations. In some cases, the sidewalls 124A,B can be omitted and the supports 124A,B can function as sidewalls.

Figure 4:
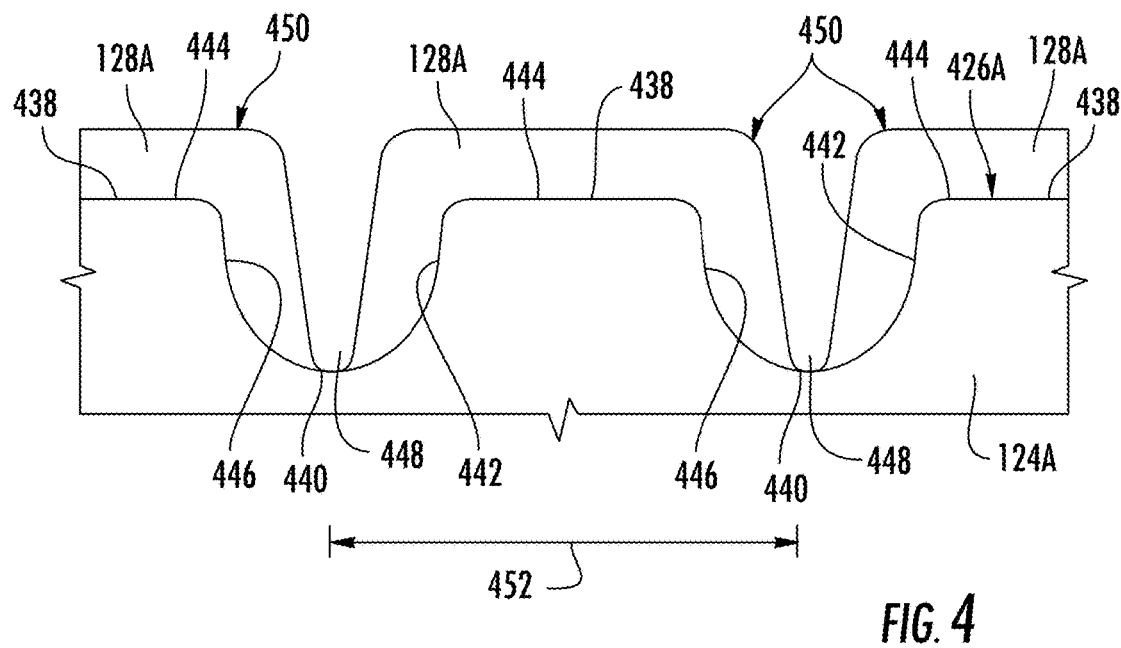
FIG. 4 is a partial side view of the segment of fastening tape of FIG. 1.

As illustrated, the supports 124A,B extend generally parallel to the sidewalls 114A,B in the longitudinal direction 112. As described in greater detail below with reference to FIG. 4, each support 124A,B includes a support top surface 426 (only support top surface 426A is illustrated in FIG. 4). In various examples, the support top surface 426 defines a plurality of plateaus 438 and a plurality of valleys 440. A height of the supports 124A,B, which is the distance from the top surface 108 to the support top surface 426, is greater at the plateaus 438 than at the valleys 440 so that the height of the supports 124A,B varies in the longitudinal direction 112.

Referring to FIGS. 1-3, the fastening tape 100 includes magnetic material 128A,B, such as, but not limited to, iron or a ferrous alloy, positioned between the sidewalls 114A,B. In one non-limiting example, the magnetic material 128 is iron monofilament, but any other suitable magnetic material can be present. As illustrated in FIGS. 1-3, the magnetic material 128 extends in the longitudinal direction 112 and is generally parallel to the sidewalls 114A,B. In the example shown in FIGS. 1-3, the magnetic material 128A,B is positioned on the supports 124A,B, respectively. In various examples, the magnetic material 128A,B is positioned on at least a portion of at least one of the plateaus 438 or at least one of the valleys 440 of the support top surface 426. For example and without limitation, the magnetic material 128 can be positioned on only the plateaus 438, only the valleys 440, or on both the plateaus 438 and valleys 440 of the support top surface 426. In some cases, the magnetic material 128 is positioned on only a portion of the plateaus 438 and/or the valleys 440.

Each of the magnetic materials 128A,B can be a continuous element in the longitudinal direction 112 (see, for example, FIGS. 13-19 and 22-47) or may be segments extending in the longitudinal direction 112 such that a height of the magnetic materials 128A,B varies in the longitudinal direction 112 (see, for example, FIGS. 1-12B). The height of the magnetic materials 128A,B can be made discontinuous by cutting the magnetic material into separate pieces or by making a series of notches in a continuous piece of magnetic material such that a height of each of the magnetic materials 128A,B relative to the top surface 108 of the body 102 varies as the material extends in the longitudinal direction 112. As used herein, a separation or gap between separate pieces of magnetic material 128A,B arranged in the longitudinal direction 112 constitutes a variation in height of the magnetic material 128A,B even if no magnetic material 128A,B is present in the gap. By varying height of the magnetic materials 128A,B in the longitudinal direction 112, the fastening tape 100 is more flexible in the longitudinal direction 112. This allows the fastening tape 100 to better conform to a curved surface on which the fastening tape 100 may be positioned, which in turn reduces the likelihood of foam intruding into the fasteners 118 of the fastening tape 100.

The fastening tape 100 also includes transverse walls 130 that extend in the upward direction from the top surface 108 of the body 102 in the lateral direction 110. As shown in FIGS. 1-3, some of the transverse walls 130 connect laterally adjacent fasteners 118. Others of the transverse walls 130 connect some of the fasteners 118 and the supports 124A,B, respectively. In some cases, some of the transverse walls 130 connect the supports 124A,B and the sidewalls 114A,B, respectively. In one aspect, transverse walls 130 are connected on one or both sides of an individual fastener 118 to help increase the strength of the fastener 118. However, the transverse walls 130 need not contain, or be connected to, the fasteners 118.

Each transverse wall 130 defines a height, which is a distance from the top surface 108 of the body 102 to a topmost end 134 of the transverse wall 130. In some examples, the height of the transverse walls 130 is approximately the same as the height of the fasteners 118, although it need not be. In some aspects, each transverse wall 130 defines a transverse wall width. In some cases, the transverse wall width generally corresponds to a distance between the adjacent structures that the transverse wall 130 connects, such as a distance between adjacent fasteners 118, a distance between a fastener 118 and a support 124A,B, a distance between a support 124A,B and a sidewall 114A,B, etc., minus a width of a slit 136 (or slits 136) (discussed below) if present.

As shown in FIGS. 1-3, at least one slit 136 is within a transverse wall 130 or adjacent to an end of at least one transverse wall 130 of the fastening tape 100. In the example illustrated in FIGS. 1-3, the slit 136 extends from the topmost end 134 of the transverse wall 130 towards the top surface 108 of the body 102. The slit 136 may represent a gap or space within a transverse wall 130 and/or a gap or space between a transverse wall 130 and an adjacent structure that the transverse wall 130 connects. For example, the slit 136 may be defined by a transverse wall 130 or by a transverse wall 130 and some other component of the fastening tape 100. As a non-limiting example, the slit 136 may be defined by a transverse wall 130, by a transverse wall 130 and a fastener 118, and/or by a transverse wall 130 and a sidewall 114A,B. In some cases, one or both sides of a fastener 118 do not abut a slit 136.

In some examples, the slit 136 extends from the topmost end 134 of the transverse wall 130 to the top surface of the body 102. In some cases, the slit 136 extends from the topmost end 134 of the transverse wall 130 to below the top surface 108 of the body 102 such that a groove is formed in the top surface 108 of the body 102 (see, for example, FIG. 33B). In other cases, the slit extends from the topmost end 134 of the transverse wall 130 to a distance above the top surface 108 of the body 102 but below the topmost end 134. Any combination of such slits may be present in the fastening tape 100.

The location of the at least one slit 136 and/or the number of slits 136 may vary. Along these lines, any row of fasteners 118 may include any suitable number of slits. As illustrated in FIG. 3, the at least one slit 136 need not be present within all transverse walls 130. Moreover, more than one slit 136 may be present in one or more of the transverse walls 130. In one non-limiting example, the number of slits 136 in a row is one less than the number of transverse walls 130 in the row, although this need not be the case. Moreover, a plurality of slits 136 can be present in multiple rows of fasteners 118. In those examples, the location of slits 136 in one row of fasteners 118 may be aligned or offset from the location of slits 136 in other rows of fasteners 118. In addition, the number of slits 136 in one row of fasteners 118 may be the same or may be different from the number of slits 136 in other rows of fasteners 118.

In some cases, the fastening tape 100 optionally includes a rib, discussed in more detail below, positioned within the slit 136 and extending in the upward direction from the top surface 108 of the body 102. In one aspect where a plurality of rows of fasteners 118 are present, the rib can extend in the longitudinal direction 112 along the top surface 108 of the body 102 through longitudinally aligned slits 136. In other examples, the rib may be confined to a particular slit or subset of slits.

The slits 136 may have a uniform or non-uniform width. In some aspects, the slits 136 adjacent or within those transverse walls 130 connecting adjacent fasteners 118 may have a slit width that is less than the slit widths of the slits 136 adjacent or within those transverse walls 130 connecting the sidewalls 114A,B, although they need not. In one non-limiting example, each of the slits or a subset of slits 136 has a width between approximately 0.1 mm and 0.2 mm or between approximately 0.05 mm and approximately 0.2 mm. In another non-limiting example, at least some of the slits 136 narrow in width from the top surface 108 to the topmost end 134 of the transverse wall 130. The slits 136 can all have the same width, although they need not. In one non-limiting example, a width of some of the slits or subset of slits 136 is approximately 0.1 mm while a width of others of the slits 136 is approximately 0.2 mm. For example, a slit 136 between a transverse wall 130 connecting a fastener 118 and the support 124A can have a width of approximately 0.2 mm or any other suitable width, while a slit 136 between a transverse wall 130 connecting adjacent fasteners 118 can have a width of approximately 0.1 mm or any other suitable width. The width of the slit or slits 136 may be selected to minimize foam intrusion during the molding process while allowing for a desired level of flexibility. In some cases, the width of the slit 136 is less than the transverse wall width.

The presence of slit or slits 136 may improve flexibility of the fastening tape 100 in the lateral direction 110 compared to a fastening tape that does not include a slit or slits 136. In some examples, the slit 136 can have a height within a height range, as described in greater detail below, to help provide a desired amount of flexibility in the fastening tape 100. This allows the fastening tape 100 to better conform to a curved surface on which the fastening tape 100 may be positioned, which in turn reduces the likelihood of foam intruding into the fasteners 118 of the fastening tape 100.

FIG. 4 illustrates a portion of the support 124A. Although reference is made to the support 124A, the following discussion is equally applicable to the support 124B. As illustrated in FIG. 4, in some examples, the support top surface 426A defines the plurality of plateaus 438 and valleys 440. In various examples, to improve flexibility of the fastening tape 100, at least one valley 440 can be positioned between adjacent rows of fasteners 118. In these examples, the plateaus 438 can be aligned with the rows of fasteners 118. In some aspects, each plateau 438 has a front-facing portion 442 of the support top surface 426A, an upward-facing portion 444 of the support top surface 426A, and a back-facing portion 446 of the support top surface 426A. In other examples, the supports 124 can have any suitable shape and dimensions. In some examples, a pitch of the plateaus 438 may be greater than a pitch of the sidewalls 114A,B (or a pitch of each of the sidewall components 116).

As discussed earlier, the magnetic material 128A may be positioned on the support 124A. The magnetic material 128A is positioned on at least a portion of one of the plateaus 438 and/or a portion of one of the plurality of valleys 440 of the support top surface 426A. As illustrated in FIG. 4, in some examples, the magnetic material 128A includes a plurality of separate segments positioned on portions of the support top surface 426A. In the example shown in FIG. 4, the separate segments of magnetic material 128A are positioned on the plateaus 438 and on portions of the valleys 440. The magnetic material 128A can be configured to have a discontinuous height through various mechanisms including, but not limited to, cutting of a continuous element into separate pieces, making a series of notches in a continuous element, depositing separate pieces onto the support top surface 426A, or using various other suitable mechanisms. As mentioned above, a separation or gap between separate pieces of magnetic material 128A arranged in the longitudinal direction 112 constitutes a variation in height of the magnetic material 128A even if no magnetic material 128A is present in the gap. If the height of the magnetic material 128A varies in the longitudinal direction 112, the fastening tape 100 can be more flexible as there is less of the magnetic material 128A resisting bending or twisting. As such, the fastening tape 100 may conform better to a curved surface on which the fastening tape 100 is positioned, which in turn reduces the likelihood of foam intruding into the fasteners 118 of the fastening tape 100, as described in greater detail below.

In one non-limiting example, the magnetic material 128A includes separate segments positioned on one or more of the front-facing portion 442 of the support top surface 426A, the upward-facing portion 444 of the support top surface 426A, or the back-facing portion 446 of the support top surface 426A of each plateau 438. In another non-limiting example, the separate segments of the magnetic material 128A are positioned on the front-facing portion 442, the upward-facing portion 444, and the back-facing portion 446 of the support top surface 426A such that gaps 448 are formed between adjacent segments. As mentioned, a separation or gap between separate pieces of magnetic material 128A arranged in the longitudinal direction 112 constitutes a variation in height of the magnetic material 128A even if no magnetic material 128A is present in the gap. In yet another non-limiting example, the separate segments of the magnetic material 128A fill the valleys 440 of the support top surface 426A or partially fill the valleys 440 such that a top surface 450 of the separate segments is flush or generally flush with the upward-facing portion 444 of the support top surface 426A, below the upward-facing portion 444, or above the upward-facing portion 444. The separate segments of the magnetic material 128A may be positioned in other locations.

Figure 16:
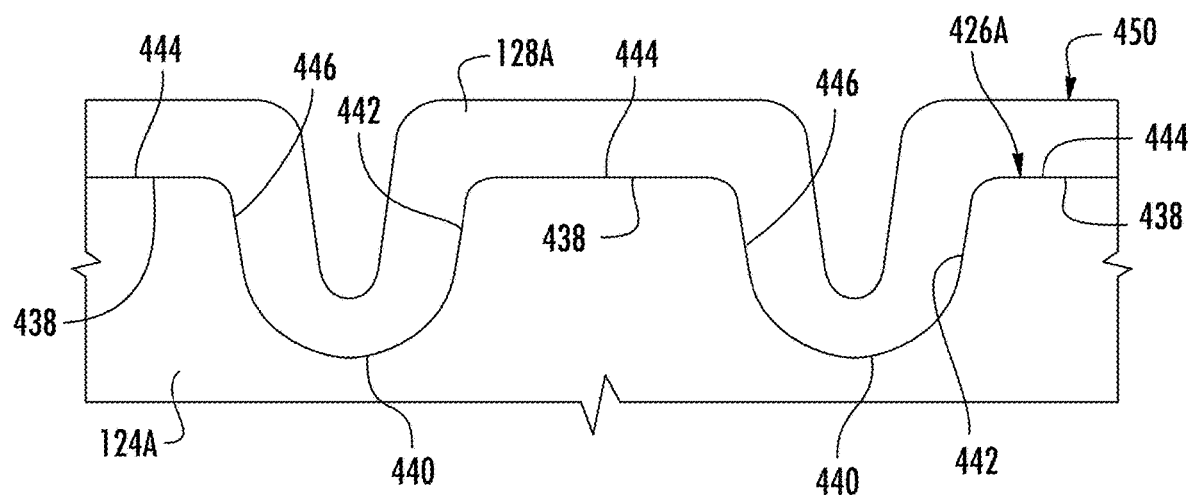
FIG. 16 is a partial side view of the segment of fastening tape of FIG. 13.

In the example of FIG. 16, a continuous piece of magnetic material 128A is positioned on the support top surface 426A of the support 124A. The continuous magnetic material 128A can be notched in the longitudinal direction 112 (see, for example, FIG. 16) such that the magnetic material 128A is positioned on both the plateaus 438 and the valleys 440 of the support top surface 426A and the height of the magnetic material 128A varies in the longitudinal direction 112.

The support 124A can be configured to support the magnetic material 128A and position the magnetic material 128A at a distance away from the top surface 108 of the body 102 to help improve the magnetic properties of the fastening tape 100. In one aspect, the magnetic material 128A is positioned such that the top surface 450 is at substantially the same height as the topmost ends 132 of the fasteners 118 and/or the topmost ends 134 of the transverse walls 130, although it need not be.

A distance between the midpoints of adjacent valleys 440 corresponds to a plateau length 452. In one example, the plateau length 452 is a distance that spans one row of fasteners 118, as illustrated in FIG. 1. In other examples, the plateau length 452 is a distance that spans less than one row of fasteners 118 or more than one row of fasteners 118, such as two rows of fasteners 118, as illustrated in the example of FIGS. 5-8, discussed below. The plateau length 452 can be varied as desired depending on the application. For example, a shorter plateau length 452 may provide greater flexibility to the fastening tape 100 in the longitudinal direction 112 compared to a longer plateau length 452. In some examples, the plateau length 452 is greater than a length of a valley 440. In these examples, the greater plateau length 452 can provide better magnetic attraction and can prevent foam intrusion when the supports 124A,B act as the sidewalls.

A length of the portion of the support top surface 426A between adjacent separate segments of magnetic material 128A can be varied to adjust the plateau length 452 and thereby the flexibility of the fastening tape 100. For example, in some aspects, a fastening tape 100 with relatively short plateau lengths 452 can define more valleys 440 along the fastening tape 100 compared to a fastening tape 100 with longer plateaus length 452. In these aspects, the fastening tape 100 with more valleys 440 can be relatively more flexible compared to the fastening tape 100 with the longer plateau lengths 452.

The length of each segment of magnetic material 128A may be uniform along the fastening tape 100 or may vary. The plateau length 452 can be uniform for each plateau 438 along the fastening tape 100 or may vary. Similarly, an interval or length of the valleys 440 may be uniform along the fastening tape 100 or may vary.

Figure 5:
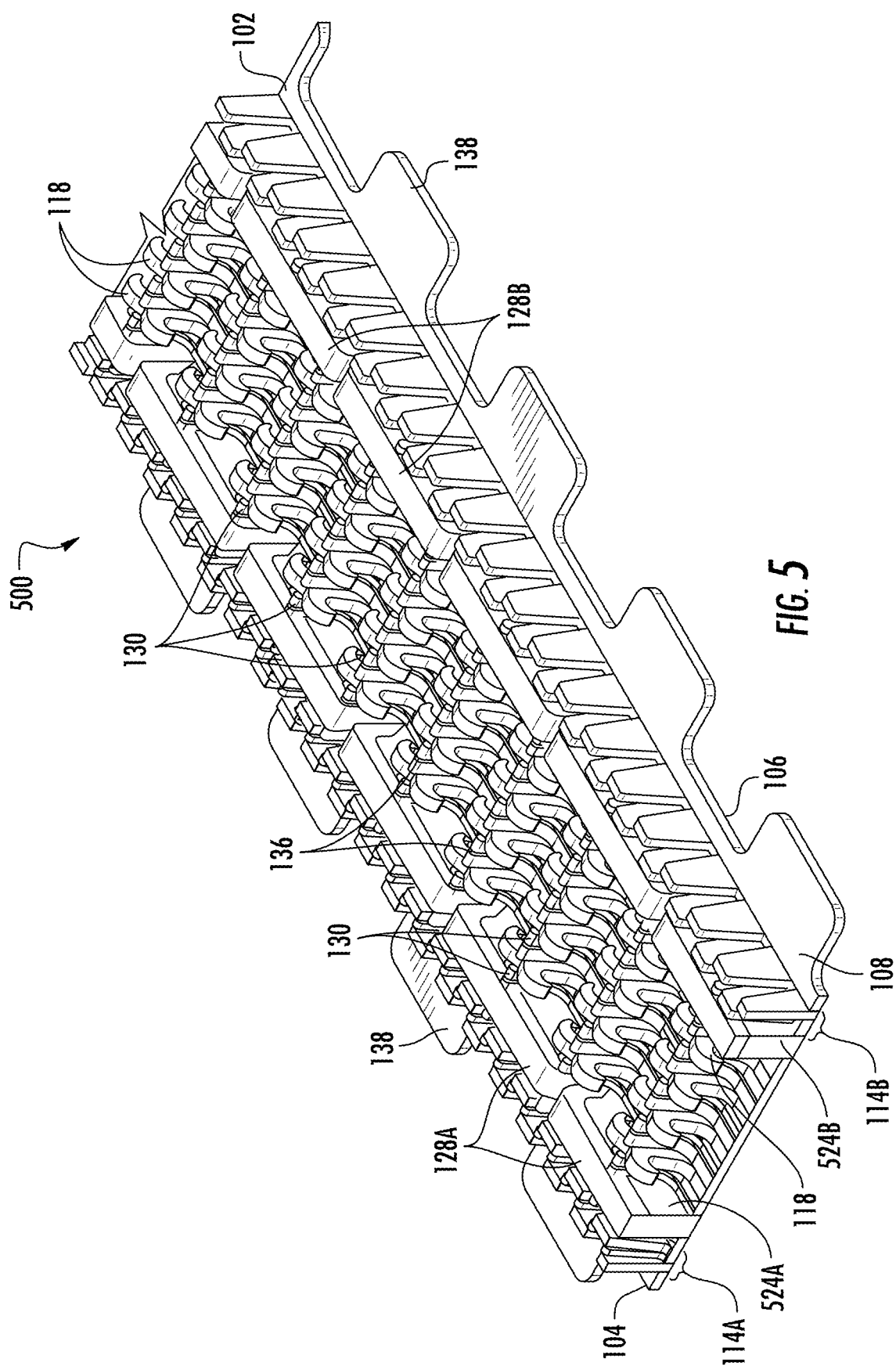
FIG. 5 is a top perspective view of a segment of fastening tape according to an aspect of the current disclosure.
Figure 6:
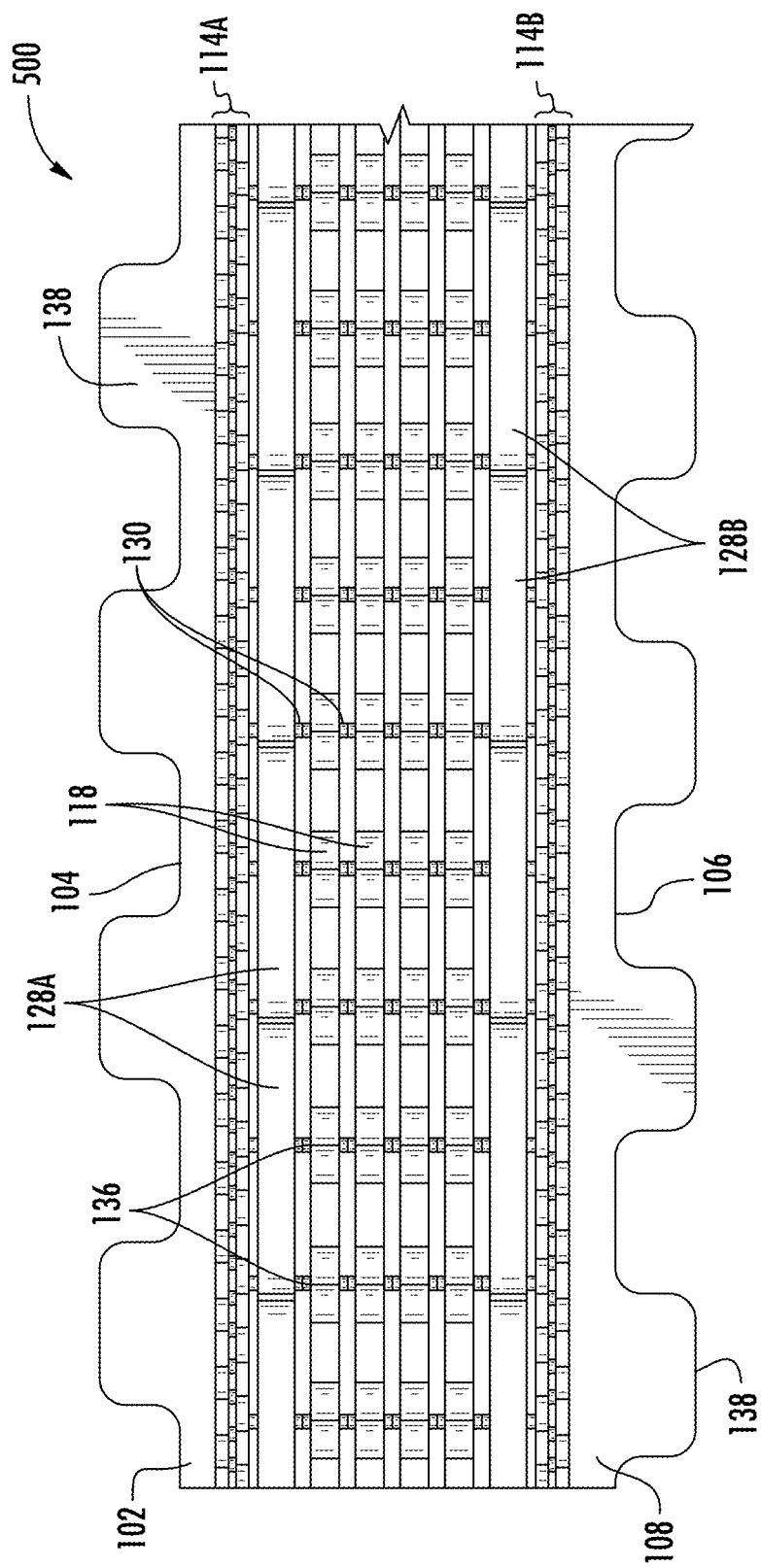
FIG. 6 is a top view of the segment of fastening tape of FIG. 5.
Figure 7:
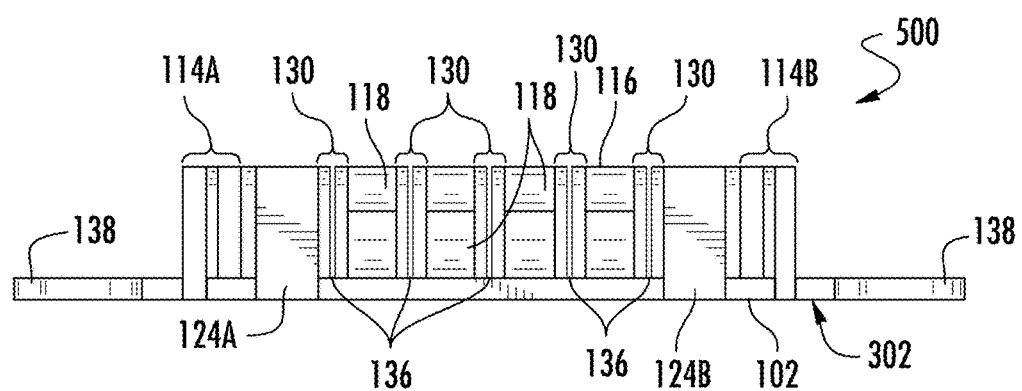
FIG. 7 is an end view of the segment of fastening tape of FIG. 5.
Figure 8:
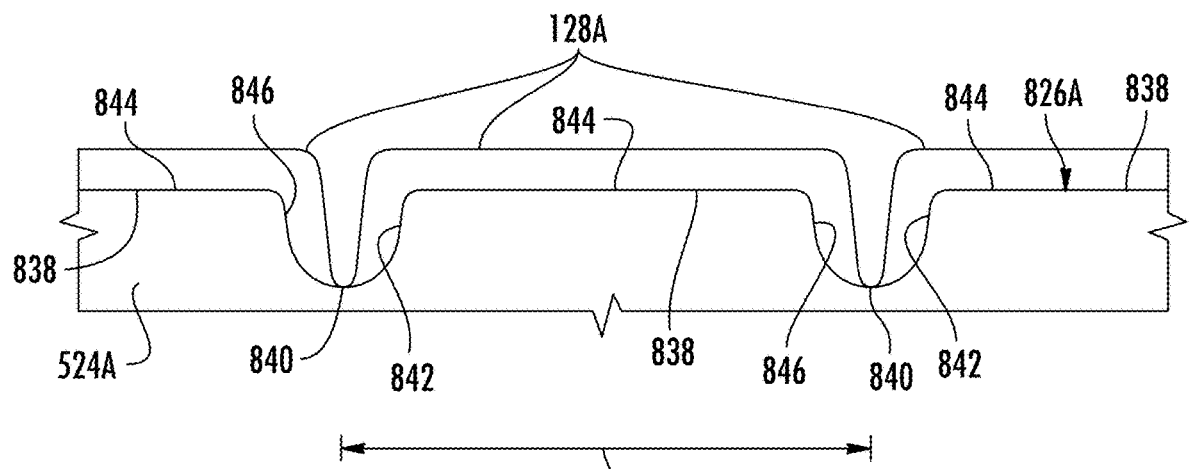
FIG. 8 is a partial side view of the segment of fastening tape of FIG. 5.
Figure 9:
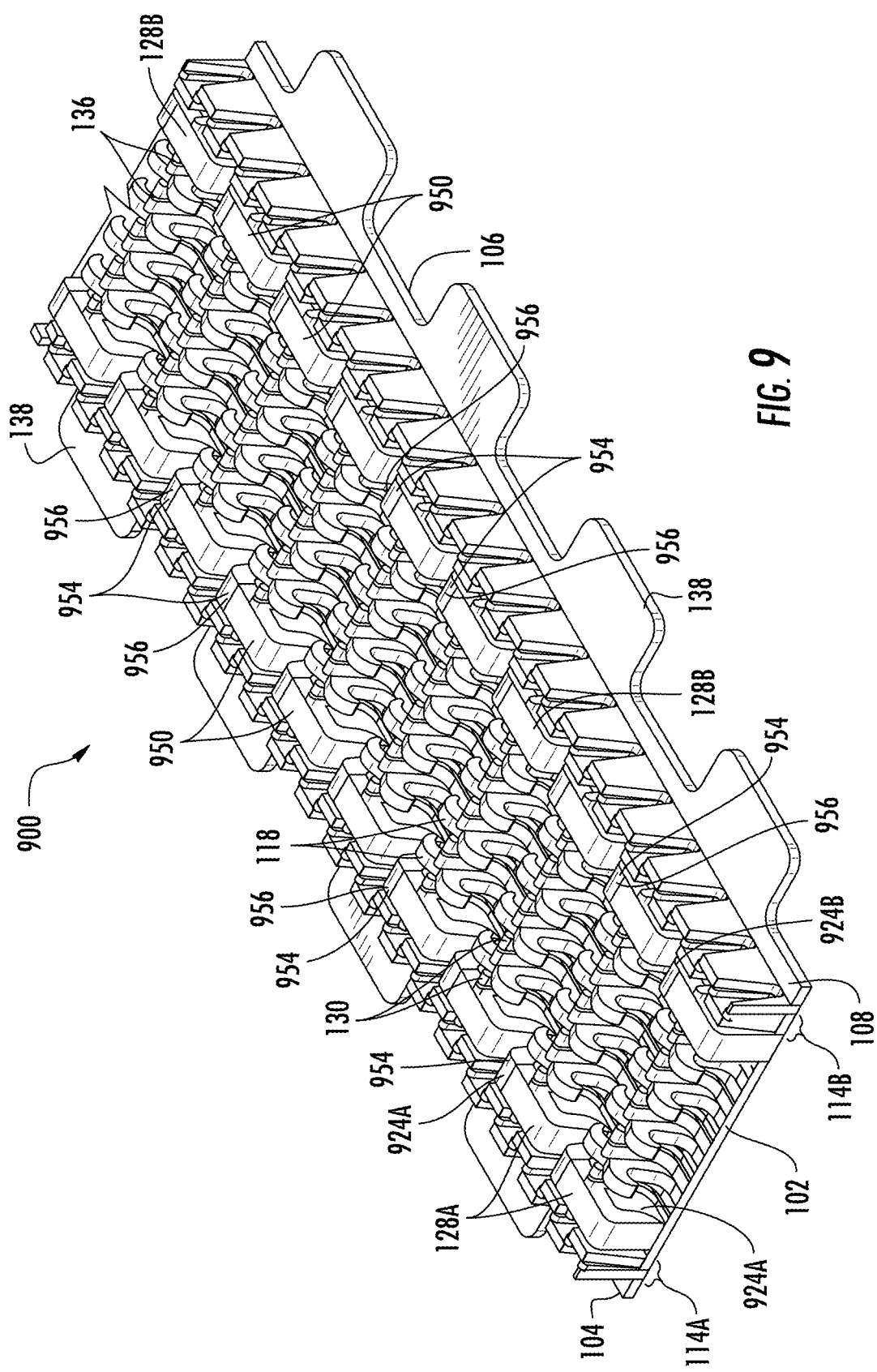
FIG. 9 is a top perspective view of a segment of fastening tape according to an aspect of the current disclosure.
Figure 10:
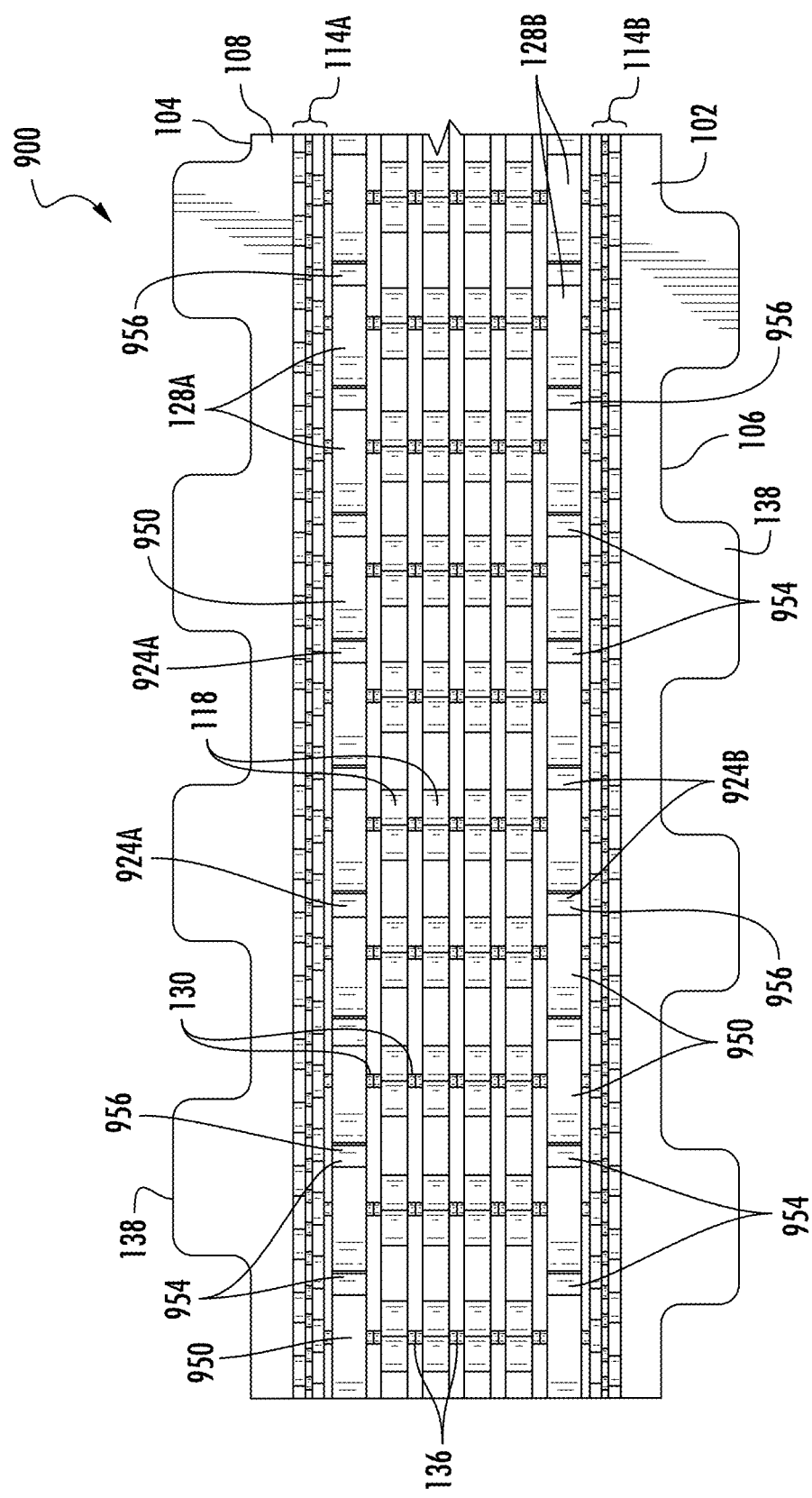
FIG. 10 is a top view of the segment of fastening tape of FIG. 9.
Figure 11:
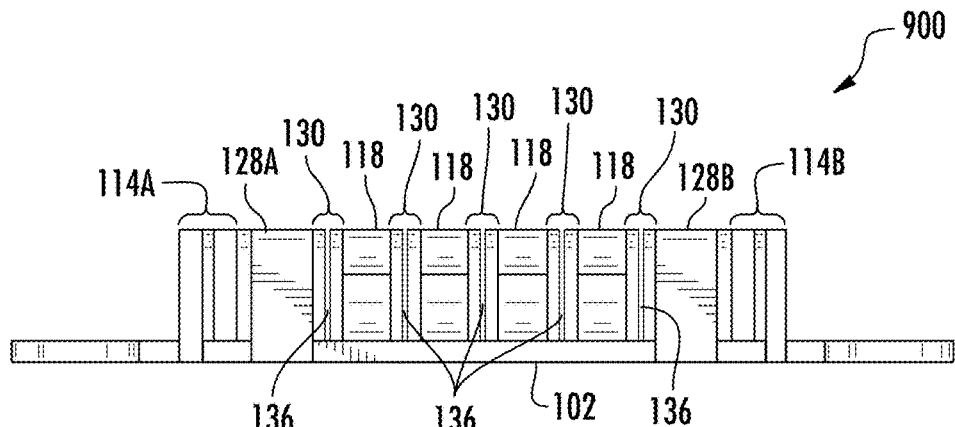
FIG. 11 is an end view of the segment of fastening tape of FIG. 9.

FIGS. 5-8 illustrate another example of the fastening tape 500. As illustrated in FIGS. 5-8, compared to the fastening tape 100, the fastening tape 500 includes supports 524A,B in place of the supports 124A,B. Similar to the supports 124A,B, each support 524A,B has a support top surface 826 (only support top surface 826A is illustrated) that defines a plurality of plateaus 838 and valleys 840. Similar to the support top surface 426, each plateau 838 of the support top surface 826 has a front-facing portion 842, an upward-facing portion 844, and a back-facing portion 846. However, as illustrated in FIG. 8, a plateau length 852 of the plateaus 838 (or a valley length of the valleys 840) is greater than the plateau length 452 of the plateaus 438 (or a valley length of the valleys 440). As illustrated in FIG. 5, the plateau length 852 spans two rows of fasteners 118.

FIGS. 9, 10, 11, and 12A illustrate another example of a fastening tape 900. As illustrated in FIGS. 9, 10, 11, and 12A, compared to the fastening tape 100 and the fastening tape 500, the fastening tape 900 includes supports 924A,B in place of the supports 124A,B and the supports 524A,B. Similar to the supports 124A,B and the supports 524A,B, each support 924A,B has a support top surface 1226 (only support top surface 1226A is illustrated) that defines a plurality of plateaus 1238 and valleys 1240. Similar to the support top surfaces 426 and 826, each plateau 1238 of the support top surfaces 1226 has a front-facing portion 1242, an upward-facing portion 1244, and a back-facing portion 1246.

As illustrated in FIGS. 9, 10, 11, and 12A, the support top surface 1226 also defines a supporting ridge 954 extending in the upward direction from each plateau 1238. Each supporting ridge 954 has an upward-facing ridge portion 956 and a front-facing ridge portion 1258 of the support top surface 1226. In the example illustrated in FIG. 12A, the separate segments of the magnetic material 128A are positioned on the front-facing portion 1242 and the upward-facing portion 1244. As illustrated, the segments of the magnetic material 128A are positioned on the upward-facing portion 1244 such that a portion of the magnetic material 128A abuts the front-facing ridge portion 1258. In some aspects, the segments of the magnetic material 128A are positioned on the upward-facing portion 1244 such that an outer surface 950 of the segments of the magnetic material 128A is generally flush with the upward-facing ridge portion 956, below the upward-facing ridge portion 956, or above the upward-facing ridge portion 956.

Figure 12A:
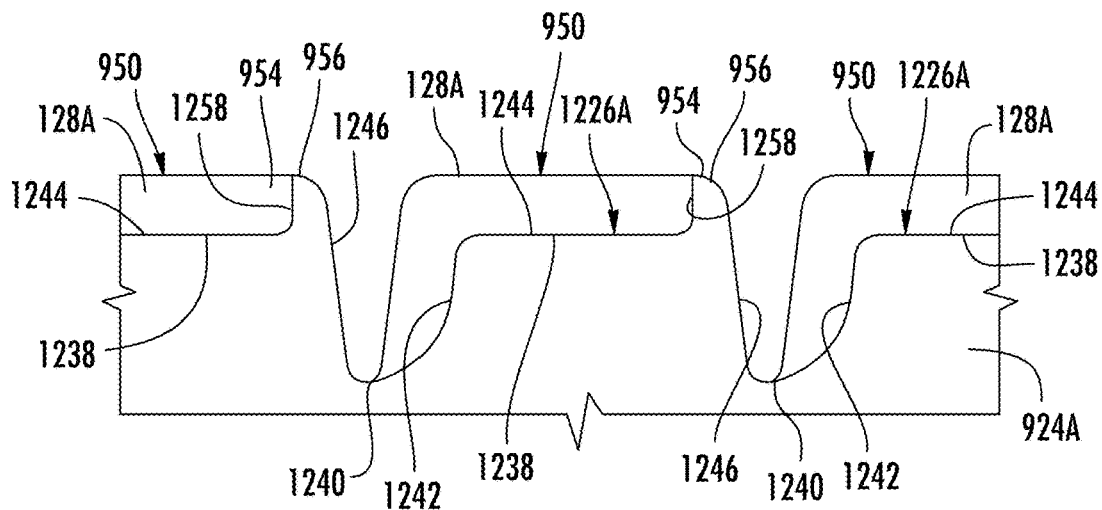
FIG. 12A is a partial side view of the segment of fastening tape of FIG. 9.
Figure 12B:
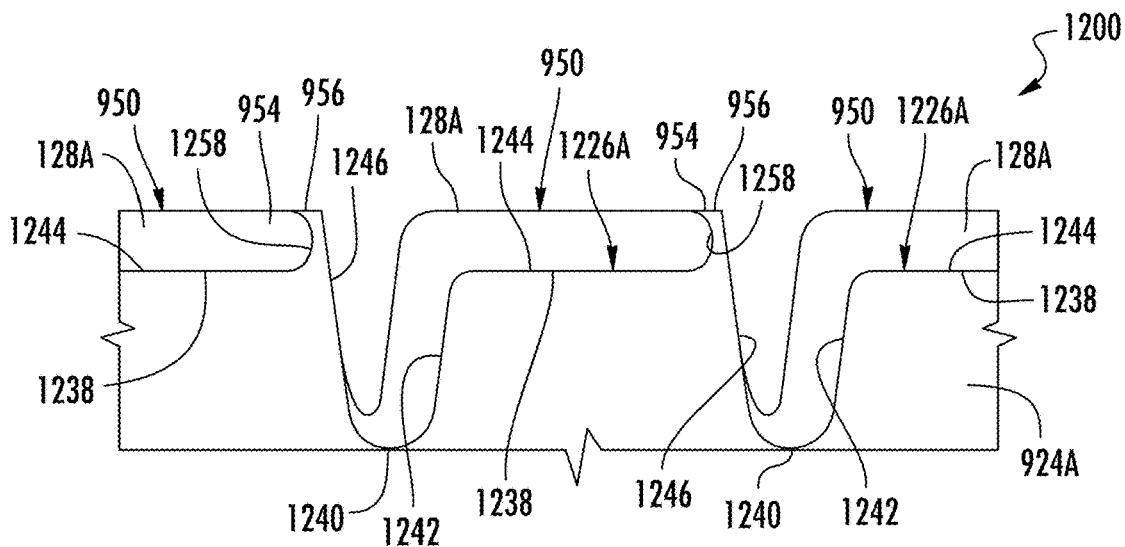
FIG. 12B is a partial side view of a segment of fastening tape according to an aspect of the current disclosure.
Figure 13:
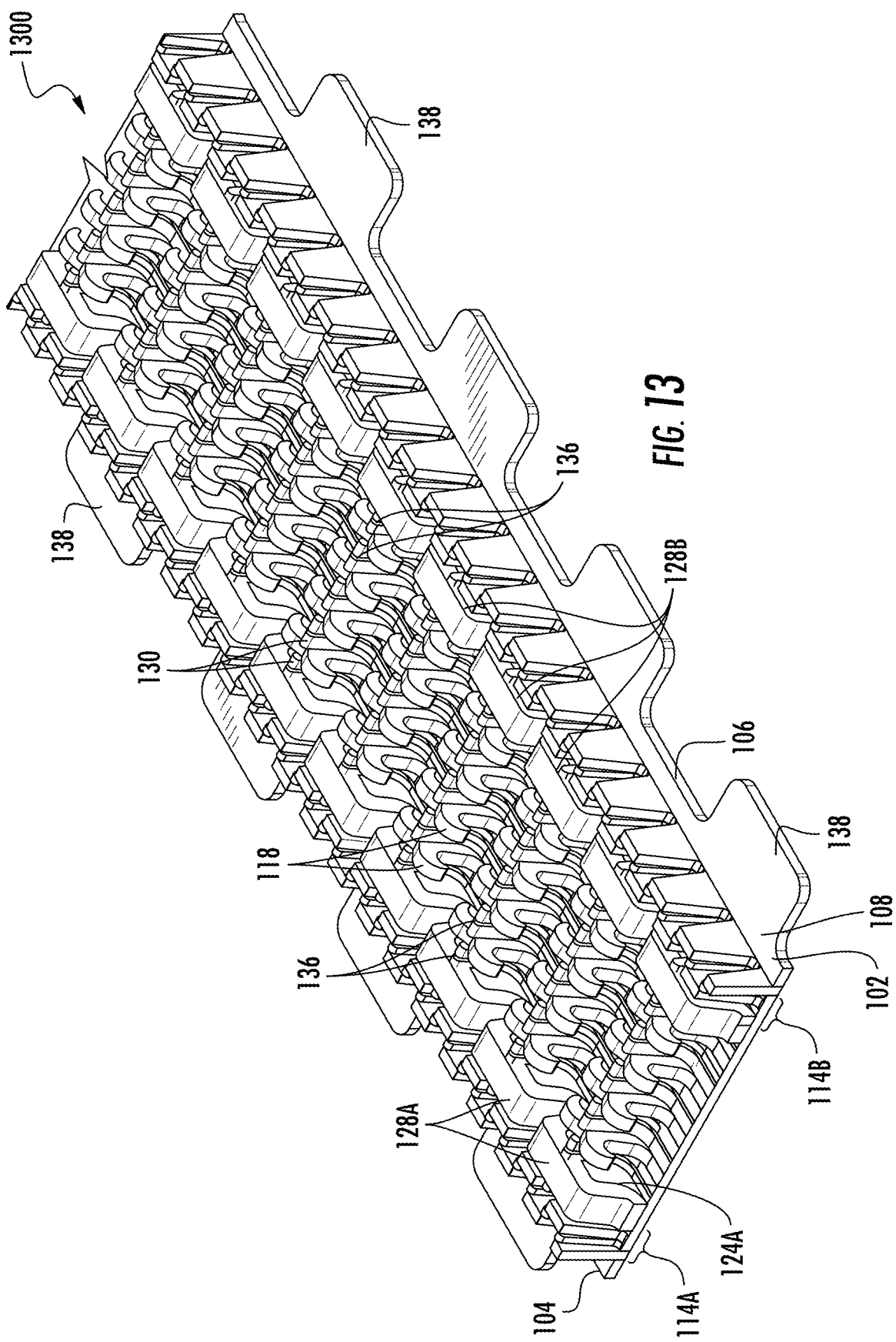
FIG. 13 is a top perspective view of a segment of fastening tape according to an aspect of the current disclosure.
Figure 14:
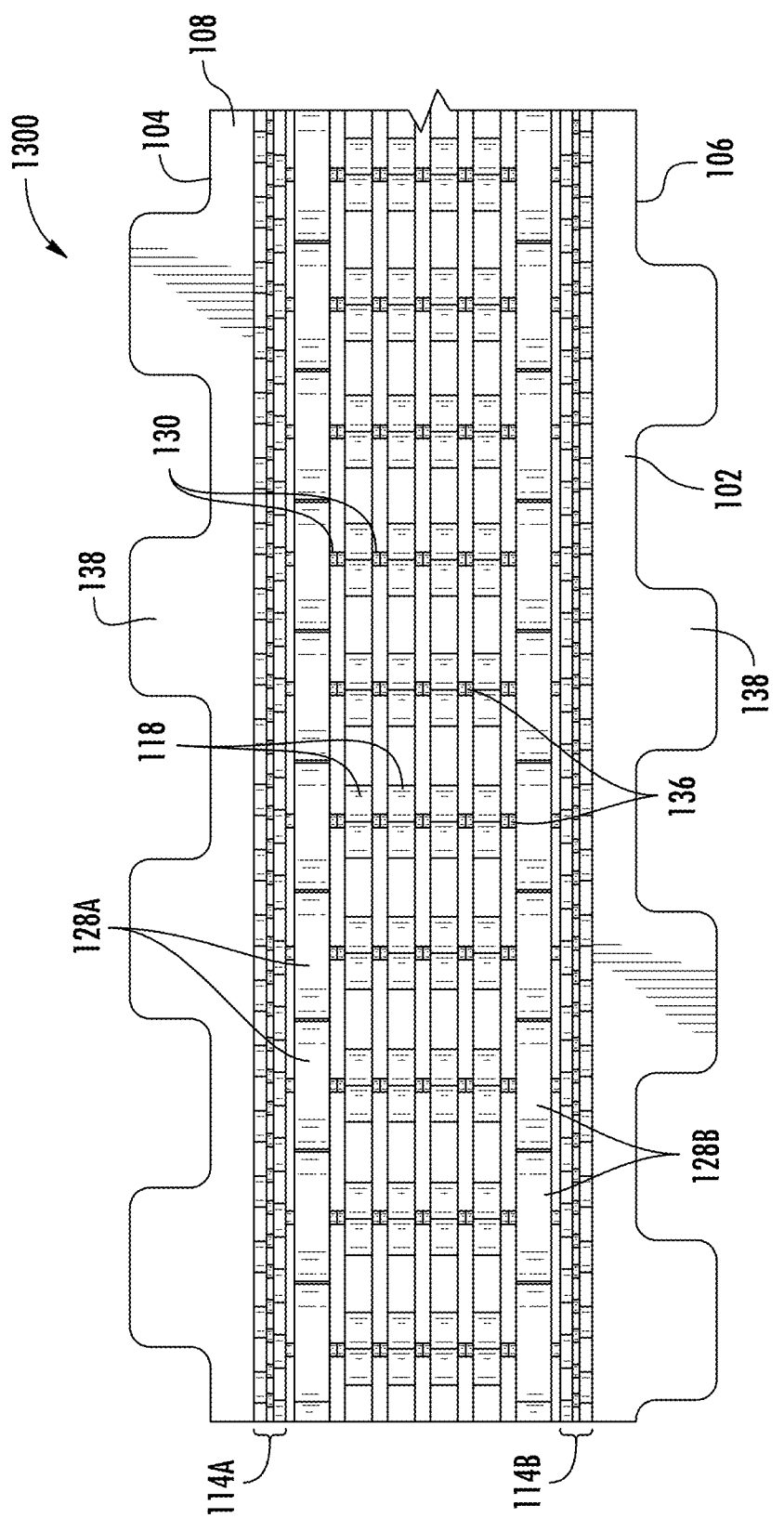
FIG. 14 is a top view of the segment of fastening tape of FIG. 13.
Figure 15:
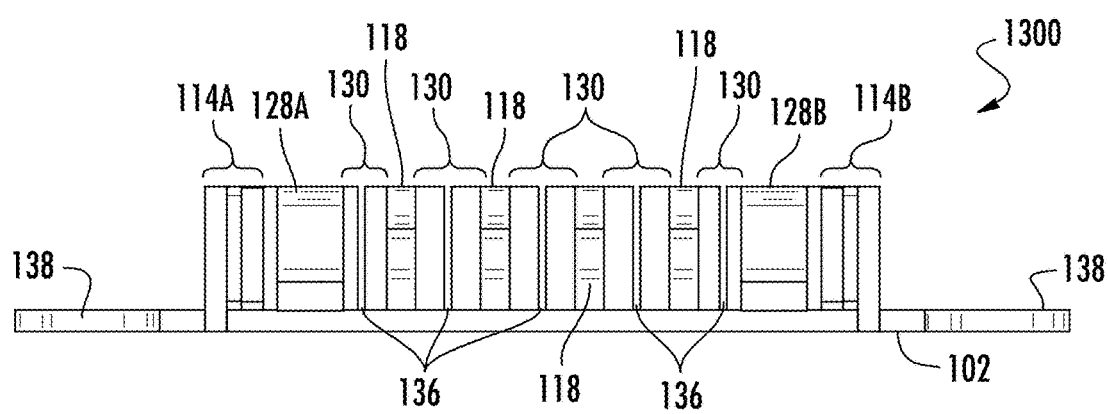
FIG. 15 is an end view of the segment of fastening tape of FIG. 13.

FIG. 12B illustrates another example of a fastening tape 1200 that is substantially similar to the fastening tape 900. As illustrated in FIG. 12B, compared to the fastening tape 900, the fastening tape 1200 includes the magnetic material 128A positioned on the top surface 1226A within the valleys 1240 and on a portion of the back-facing portion 1246.

FIGS. 13-16 illustrate another example of a fastening tape 1300. As illustrated in FIGS. 13-16, compared to the fastening tapes 100, 500, 900, and 1200, the magnetic material 128A,B of the fastening tape 1300 has a discontinuous height in the longitudinal direction 112 by defining notches in a continuous element that is positioned on the support top surface 426 across a length of the supports 124A,B in the longitudinal direction 112. In this way, the distance of the top surface 450 of the magnetic material from the surface 108 of the body 102 varies in the longitudinal direction 112. For example, the magnetic material 128A,B extends across the plateaus 438 and valleys 440 of the support top surface 426 such that a height of the top surface 450 of the magnetic material 128A,B is greater across the plateaus 438 than a height of the top surface 450 across the valleys 440.

Figure 17:
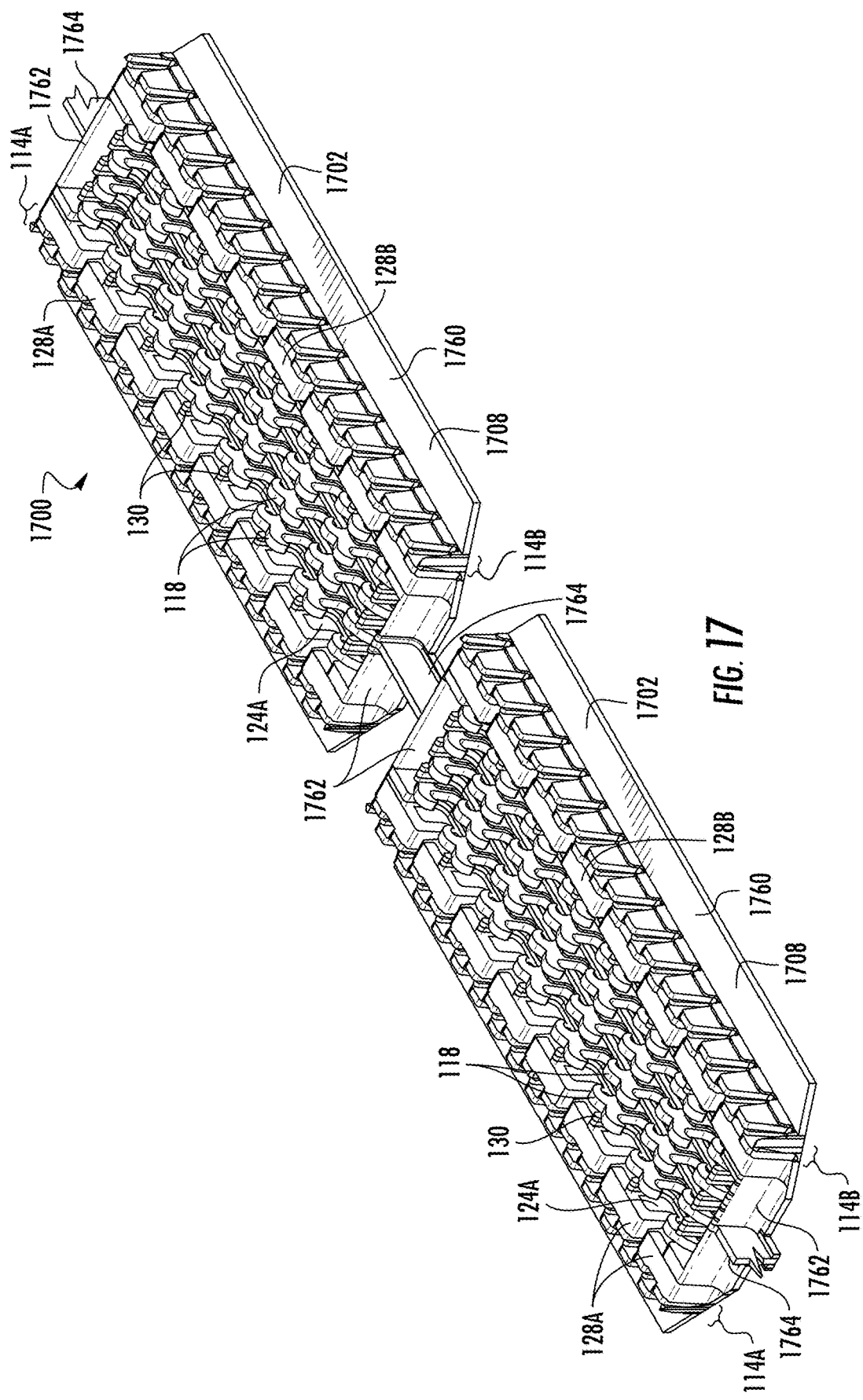
FIG. 17 is a top perspective view of two joined segments of fastening tape according to an aspect of the current disclosure.
Figure 18:
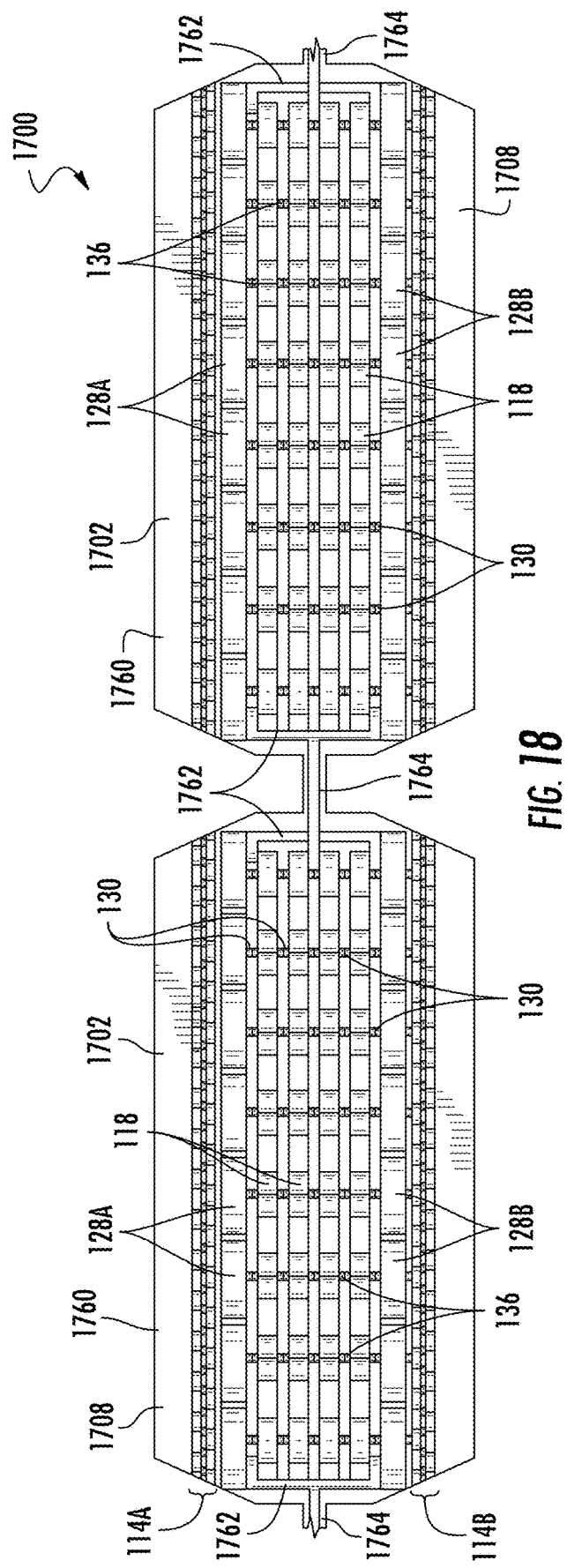
FIG. 18 is a top view of the joined segments of fastening tape of FIG. 17.
Figure 19:
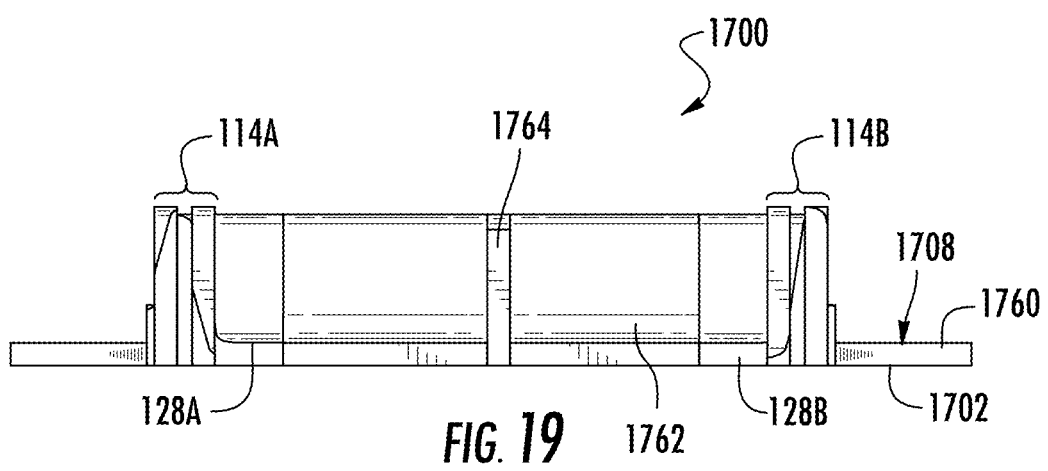
FIG. 19 is an end view of the joined segments of fastening tape of FIG. 17.

FIGS. 17-19 illustrate a fastening tape 1700 having a plurality of joined fastening tape segments 1760. Each fastening tape segment 1760 includes a body 1702 having a top surface 1708. Similar to the fastening tape 100, each fastening tape segment 1760 includes the sidewalls 114A,B, fasteners 118, transverse walls 130, and supports 124A-B (support 124B is present but not visible) extending in the upward direction from the top surface 1708, as well as the magnetic material 128A,B. As illustrated in FIGS. 17-19, in some aspects, each fastening tape segment 1760 also has barrier walls 1762 extending in the upward direction from the top surface 1708 and between the supports 124A,B. As illustrated, the fastening tape segments 1760 are connected to one another by a flexible element 1764.

Methods of making the fastening tape 100 are also disclosed. Although reference will now be made to the fastening tape 100, the below description is equally applicable to other fastening tapes, including fastening tapes 500, 900, 1300 and 1700, and the steps can be modified to achieve the differences in the fastening tapes.

Figure 20:
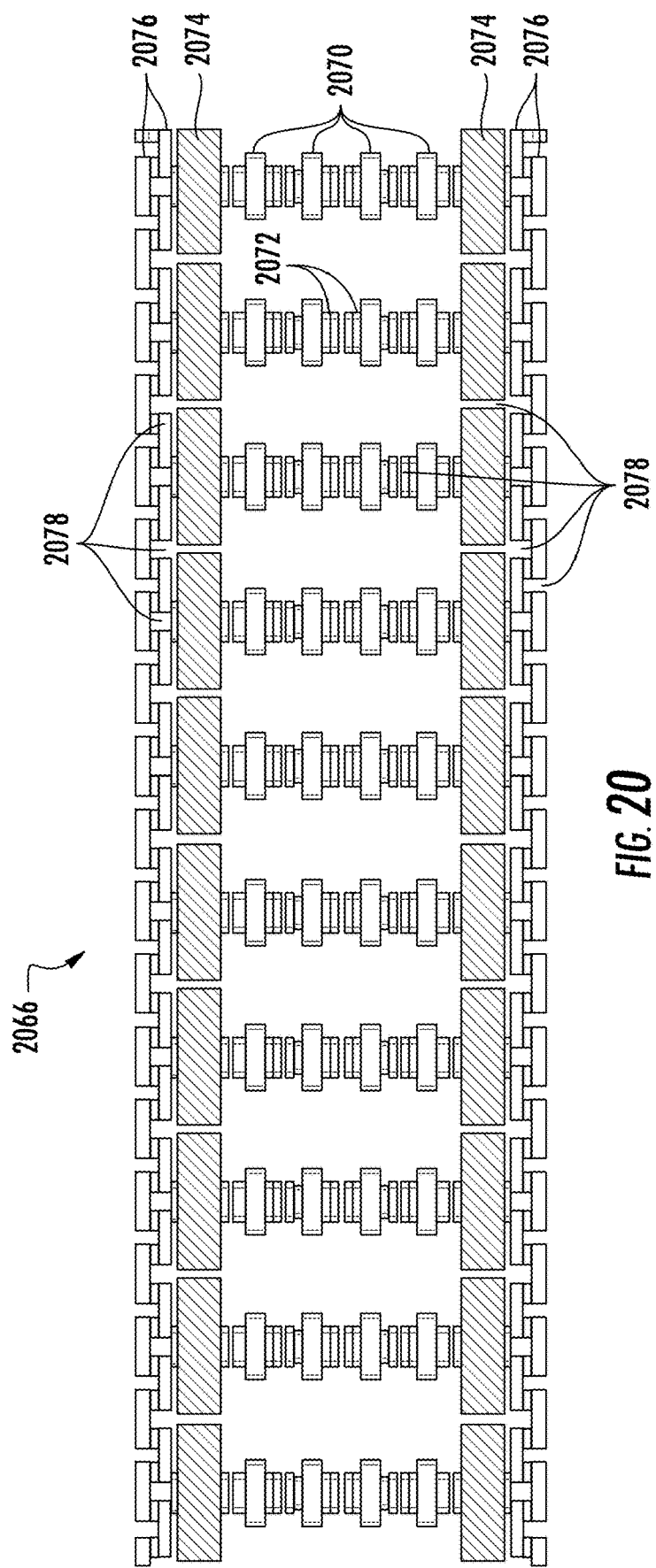
FIG. 20 is a front view of a model of an exemplary die wheel used to form the fastening tape of FIG. 1 according to an aspect of the current disclosure.

FIG. 20 illustrates an image model of an outer surface 2066 of a die wheel 2068 (illustrated in FIG. 21) used to form the fastening tape 100 as described herein. FIG. 20 is simply a representation of the outer surface 2066 for illustration purposes. The die wheel 2068 is cylindrical in shape and the outer surface 2066 includes a plurality of fastener-shaped cavities 2070 for forming the fasteners 118. In one aspect, the fastener-shaped cavities 2070 are hook-shaped cavities. As illustrated in FIG. 20, the outer surface 2066 of the die wheel 2068 also includes a plurality of cavities 2072 for forming the transverse walls 130, a plurality of cavities 2074 for forming the supports 124A,B, and a plurality of cavities 2076 for forming the sidewalls 114A,B. The outer surface 2066 of the die wheel 2068 also includes a plurality of extensions 2078 for cutting or notching the fastening tape 100 as described below.

Figure 21:
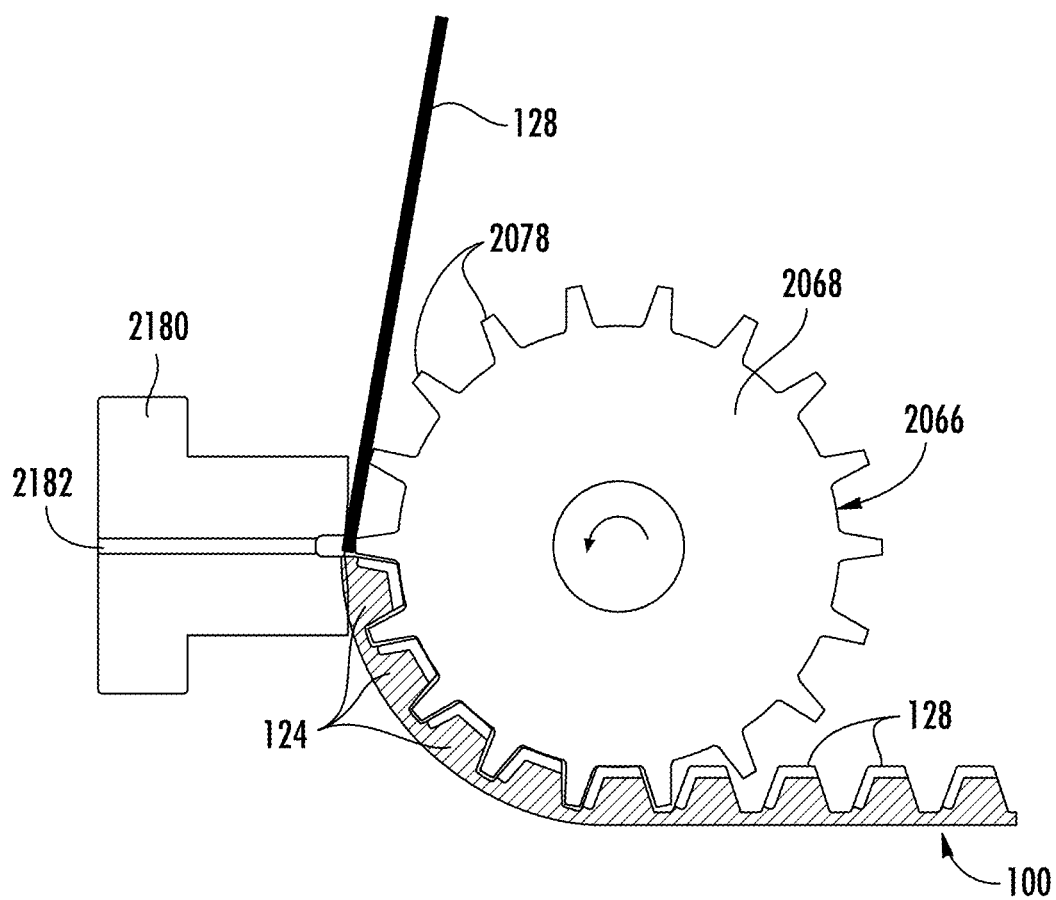
FIG. 21 is a side view of an exemplary extrusion process for forming the fastening tape of FIG. 1 according to an aspect of the current disclosure.

FIG. 21 is a schematic illustrating an exemplary extrusion process for forming the fastening tape 100 described above. As illustrated in FIG. 21, an extruder 2180 is positioned adjacent a die wheel 2068. The extruder 2180 includes a channel 2182 through which resin that forms the fastening tape 100 flows. The channel 2182 is positioned with respect to the outer surface 2066 of the die wheel 2068 such that the resin flows over the outer surface 2066 of the die wheel 2068. In one aspect, resin is introduced through channel 2182 at the same time that magnetic material 128A,B (such as an iron monofilament) is also introduced with respect to die wheel 2068 to form the fastening tape 100 with magnetic material 128A,B. The die wheel 2068 can rotate (for example counterclockwise in the view shown in FIG. 21) as the resin and magnetic material 128A,B are introduced.

In one aspect, the extensions 2078 of die wheel 2068 are sharp such that they can either cut or notch the magnetic material 128A,B to vary the height of the magnetic material 128A,B, if so desired. In one aspect, to form cut pieces, the extensions 2078 of die wheel 2068 are configured to slice completely through the magnetic material 128A,B. In another aspect, to form notches, the extensions 2078 of die wheel 2068 are configured to partially cut through the magnetic material 128A,B. During the molding process, the cut pieces or notched magnetic material 128 are positioned on the supports 124A,B, respectively, of the fastening tape 100 as the fastening tape 100 is formed. Cutting (either partially or completely) the magnetic material 128A,B to vary the height of the magnetic material 128A,B in the longitudinal direction allows for positioning of the cut/notched magnetic material 128A,B at a topmost portion of the fastening tape 100, such as at the support top surface 426, which can increase the magnetic strength of the tape as discussed above. In some aspects, the magnetic material 128A,B is formed of nylon resin containing iron powder, such that the nylon may be softened by heat generated from the extrusion process. In other aspects, the magnetic material 128A,B is secured to the fastening tape 100 physically (rather than chemically) by pressing the monofilament into the resin while the resin is soft from being heated.

The arrangement shown in FIGS. 20 and 21 is exemplary only and modifications can be made to form fastening tapes having other configurations. As one non-limiting example, the arrangement of the extensions 2078 may be modified to vary the dimensions and spacing of the magnetic material.

Figure 22:
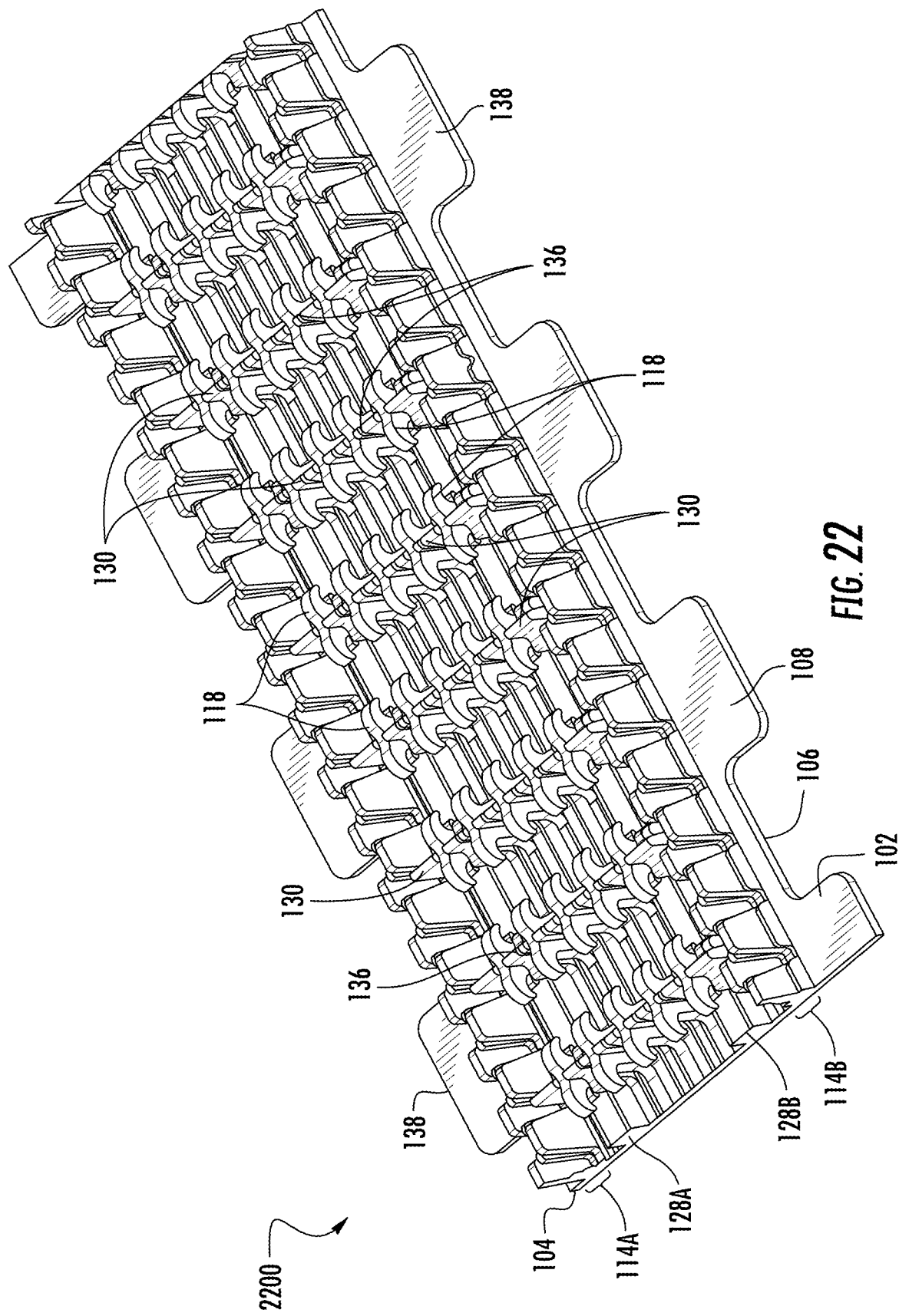
FIG. 22 is a top perspective view of a segment of fastening tape according to an aspect of the current disclosure.
Figure 23:
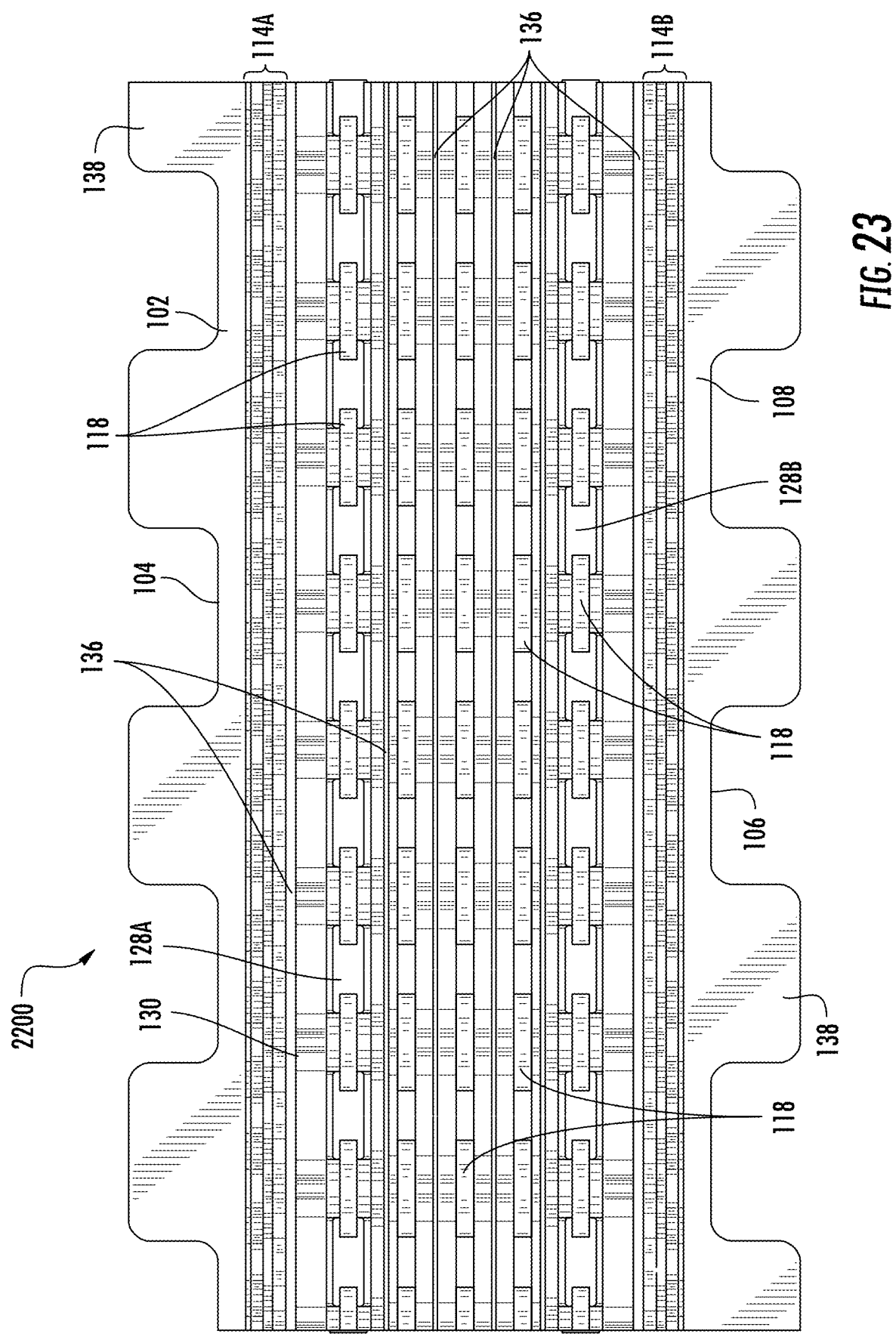
FIG. 23 is a top view of the segment of fastening tape of FIG. 22.

FIGS. 22-24 illustrate another example of a fastening tape 2200. As illustrated in FIGS. 22-24, compared to the fastening tapes 100, 500, 900, 1300, and 1700, the fastening tape 2200 does not include any supports 124. In this example, the magnetic material 128A,B is positioned offset from, but proximate to, the top surface 108 of the body 102. In some examples, the magnetic material 128A,B extends through some of the fasteners 118 and transverse walls 130, as illustrated in FIG. 24. In the example of FIGS. 22-24, the magnetic material 128A,B is a continuous piece of magnetic material that is not cut or notched.

As illustrated in FIGS. 22-24, some of the transverse walls 130 extend between the sidewalls 114A,B and those fasteners 118 adjacent to the sidewalls 114A,B, respectively. Referring to FIG. 24, in one non-limiting example, one or more slits 136 are formed within one or more transverse walls 130. In some aspects, the slits 136 within or adjacent those transverse walls 130 connecting adjacent fasteners 118 may have a slit width that is less than the slit widths of the slits 136 within or adjacent those transverse walls 130 connecting the sidewalls 114A,B, although they need not. The slits 136 may be present within transverse walls 130, between the transverse wall 130 and a fastener 118 and/or between the transverse wall 130 and the sidewalls 114A,B, etc.

Referring to FIGS. 25A and 25B, the fastening tape 2200 is shown positioned on a flat trench surface 2584A and on a curved trench surface 2584B. Although reference will now be made to the fastening tape 2200, the following description is equally applicable to any other disclosed fastening tapes having slits 136. During a process of forming various articles and components, such as automotive seats, the fastening tape 2200 is positioned on a trench surface within a mold. However, the shape of the trench surface may vary depending on manufacturer, component being formed, or various other factors. As non-limiting examples, a trench surface can be the flat trench surface 2584A or the curved trench surface 2584B. As illustrated in FIGS. 25A and 25B, the slits 136 can provide flexibility to the fastening tape 2200 in the lateral direction 110 such that the fastening tape 2200 better conforms to various-shaped trench surfaces. The slits 136 also can prevent or reduce foam intrusion into the fastening tape 2200 regardless of the shape of the trench surface.

In some examples, as illustrated in FIGS. 25A and 25B, the top ends of the sidewalls 114A,B, or the portions of the sidewalls 114A,B distal from the body 102, can be angled, curved, or have various other shapes such that the sidewalls 114A,B better conform with trench surfaces having various profiles. As one non-limiting example, the top ends of the sidewalls 114A,B can be angled to better conform with the curved trench surface 2584B as illustrated in FIG. 25B.

Figure 26:
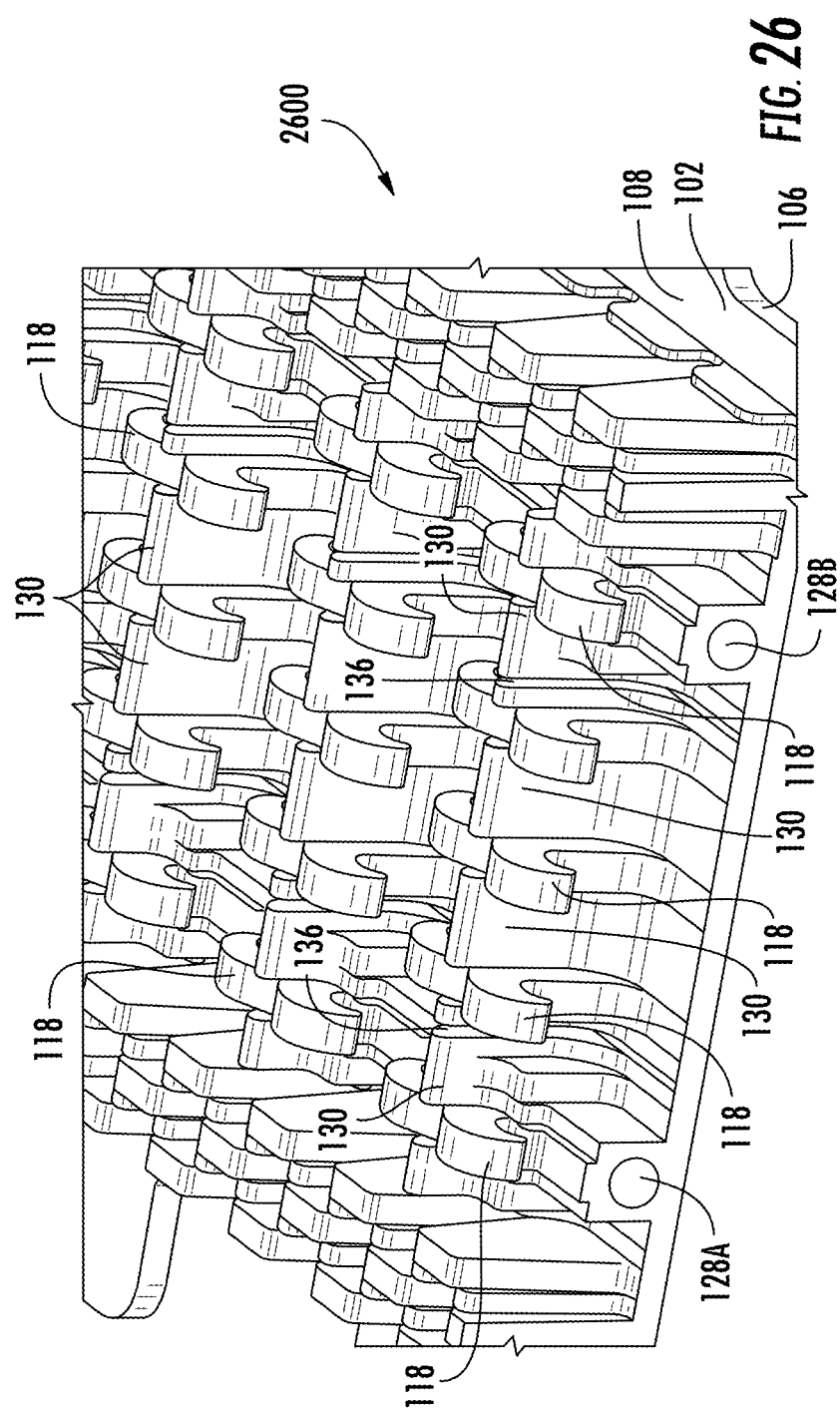
FIG. 26 is a partial top perspective view of a segment of fastening tape according to an aspect of the current disclosure.
Figure 27:
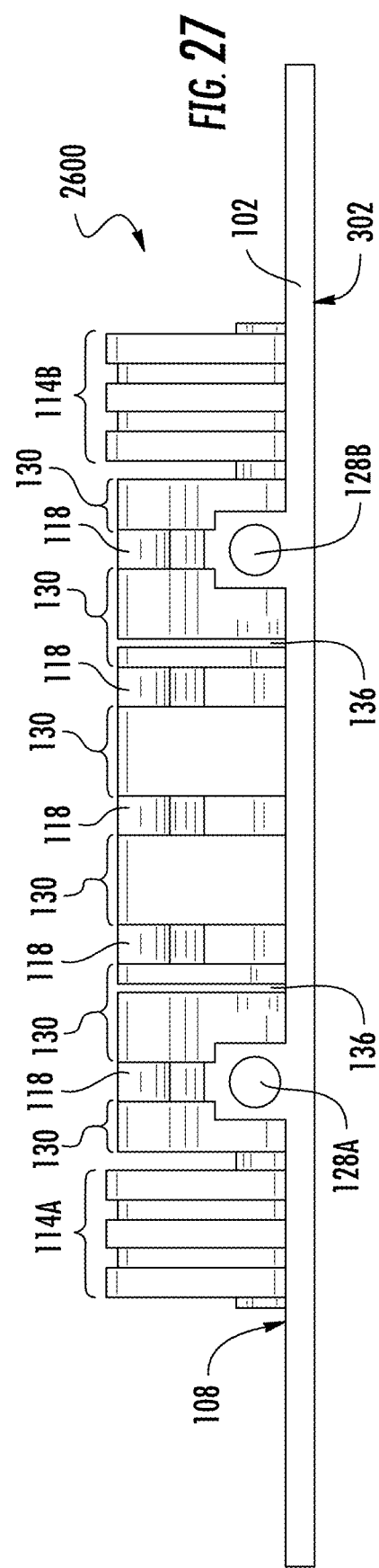
FIG. 27 is an end view of the segment of fastening tape of FIG. 26.

FIGS. 26 and 27 illustrate another example of a fastening tape 2600. As illustrated in FIGS. 26 and 27, the fastening tape 2600 is similar to the fastening tape 2200 except that slits are not present within all of the transverse walls 130 such that some of the transverse walls 130 are continuous between adjacent components. For example and without limitation, FIGS. 26 and 27 illustrate an example where some of the transverse walls 130 in a row of fasteners 118 are continuous between adjacent fasteners 118 (i.e., do not include slits).

Figure 28:
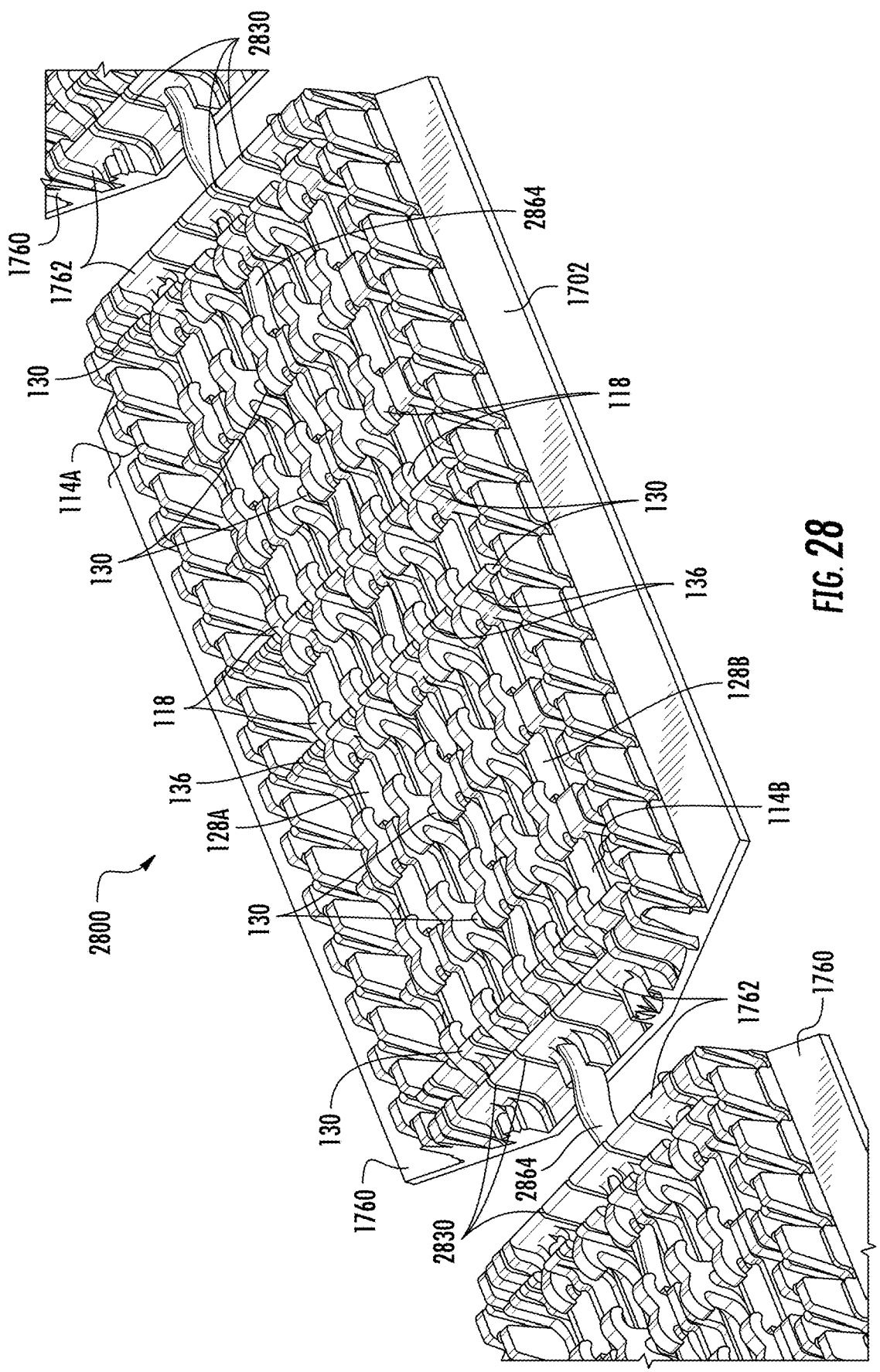
FIG. 28 is a top perspective view of joined segments of fastening tape according to an aspect of the current disclosure.
Figure 29:
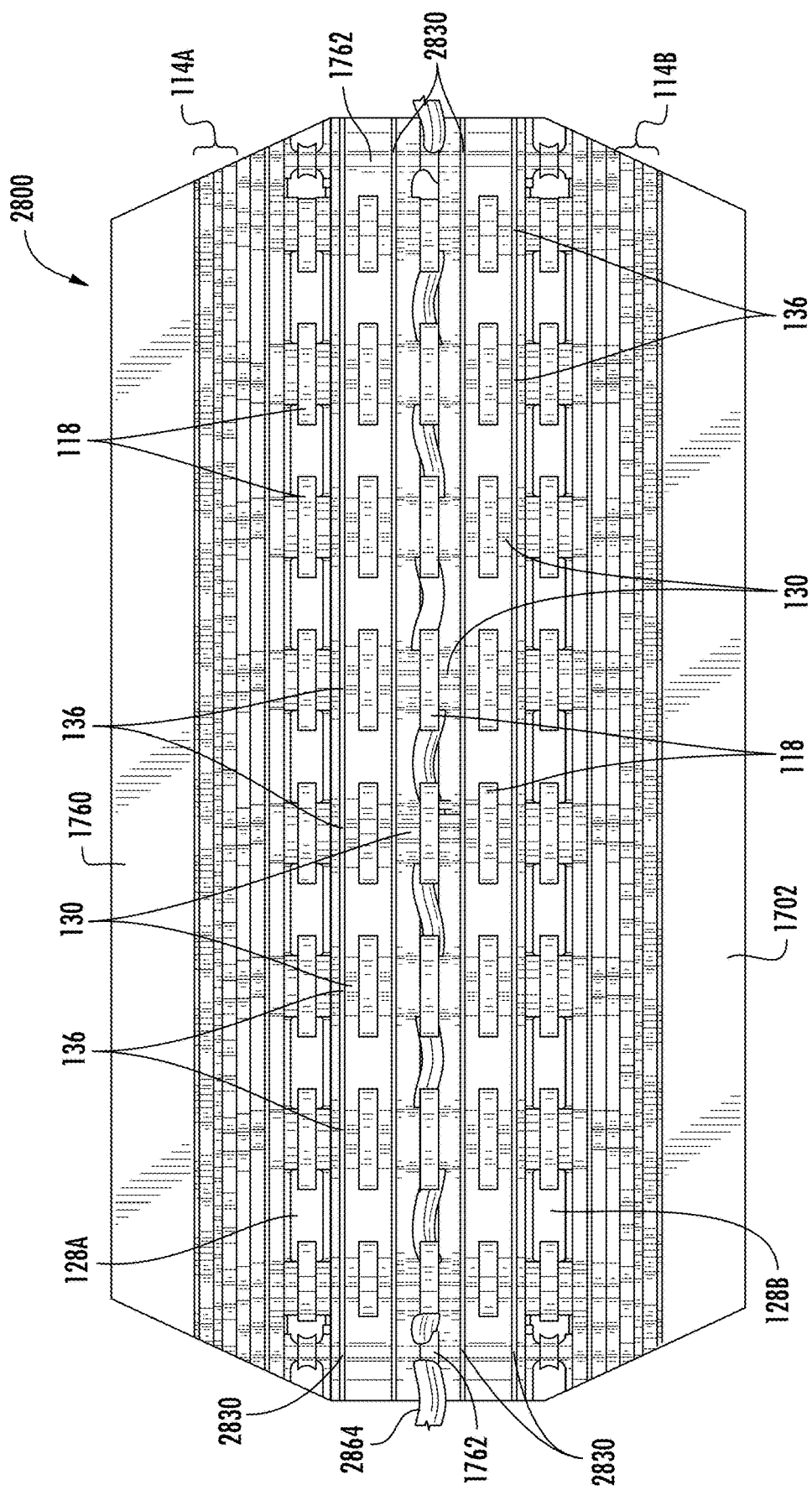
FIG. 29 is a top view of the joined segments of fastening tape of FIG. 28.
Figure 30:
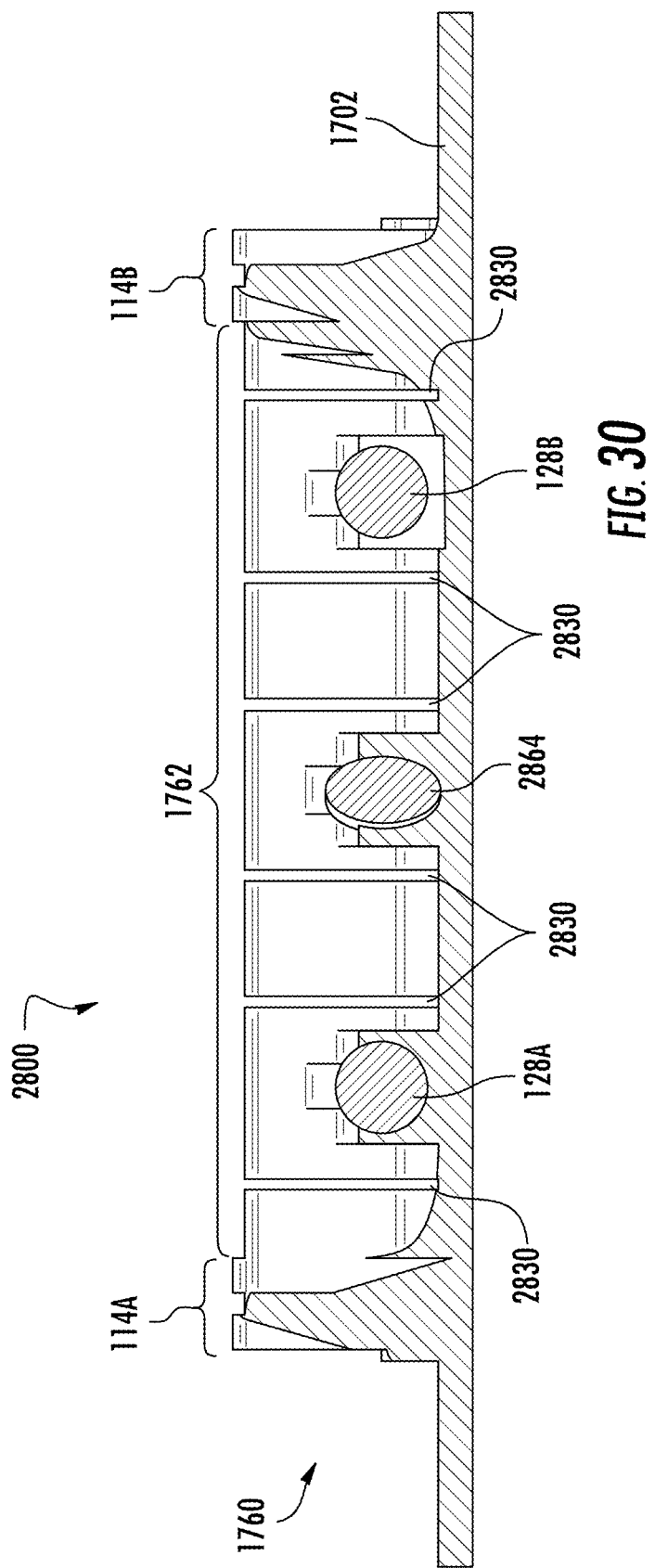
FIG. 30 is an end view of the joined segments of fastening tape of FIG. 28.

FIGS. 28-30 illustrate a fastening tape 2800 that is similar to the fastening tape 1700 in that the fastening tape 2800 includes the plurality of joined fastening tape segments 1760. Compared to the fastening tape 1700, the fastening tape 2800 does not include any supports 124. In this example, the magnetic material 128A,B may be positioned similarly to that of the fastening tapes 2200 and 2600 and may be continuous, although it need not be.

As illustrated in FIGS. 28-30, the fastening tape 2800 includes some transverse walls 130 that have a height that is approximately the same as the height of the fasteners 118 and other transverse walls 130 that have a height that is less than the height of the fasteners 118. In one non-limiting example, as illustrated in FIG. 28, each fastening tape segment 1760 includes four rows of fasteners 118 with transverse walls 130 having a height that is approximately the same as the height of the fasteners 118, and four rows of fasteners 118 with transverse walls 130 having a height that is less than the height of the fasteners 118. In other examples, various other combinations of transverse walls 130 can be present.

Compared to the fastening tape 1700, the illustrated barrier walls 1762 of the fastening tape 2800 include slits 2830, which may be substantially similar to the slits 136, although they need not be. In another aspect, the fastening tape 2800 includes a flexible element 2864 which can connects the fastening tape segments 1760. As illustrated in FIGS. 28-30, in some aspects, the flexible element 2864 is positioned along the body 1702 between the sidewalls 114A,B. In another aspect, the flexible element 2864 is positioned between the magnetic material 128A,B. In a further aspect, the flexible element 2864 extends through some of the fasteners 118, transverse walls 130, and/or barrier walls 1762.

FIGS. 31, 32, 33A, and 34 illustrate another example of a fastening tape 3100. As illustrated, the fastening tape 3100 is similar to the fastening tape 2200 except that the fastening tape 3100 defines ribs 3286 (see FIGS. 32, 33A, and 34) positioned within one or more of the slits 136 of the transverse walls 130. In some aspects, the ribs 3286 can help control the flexibility of the fastening tape 3100. For example, the ribs 3286 may prevent the fastening tape 3100 from being too flexible for a user's intended application while providing an appropriate amount of flexibility for that application. In other aspects, the ribs 3286 may help during the molding process of the fastening tape 3100. For example, the ribs 3286 may help form the fasteners 118 by supporting resin (or other material used to form the fastening tape 3100) to reach the tips of the attachment portions 122 of the fasteners 118.

The ribs 3286 extend in the upward direction from the top surface 108 of the body 102. Each rib 3286 defines a height, which is a distance from the top surface 108 to a topmost end 3288 of the rib 3286. In some aspects, the height of the ribs 3286 is less than the height of the transverse walls 130. As one non-limiting example, the transverse walls 130 can have a height of approximately 1.7 mm and the ribs 3286 can have a height of approximately 0.15 mm. In other examples, the ribs and transverse walls can have other suitable heights.

Figure 34:
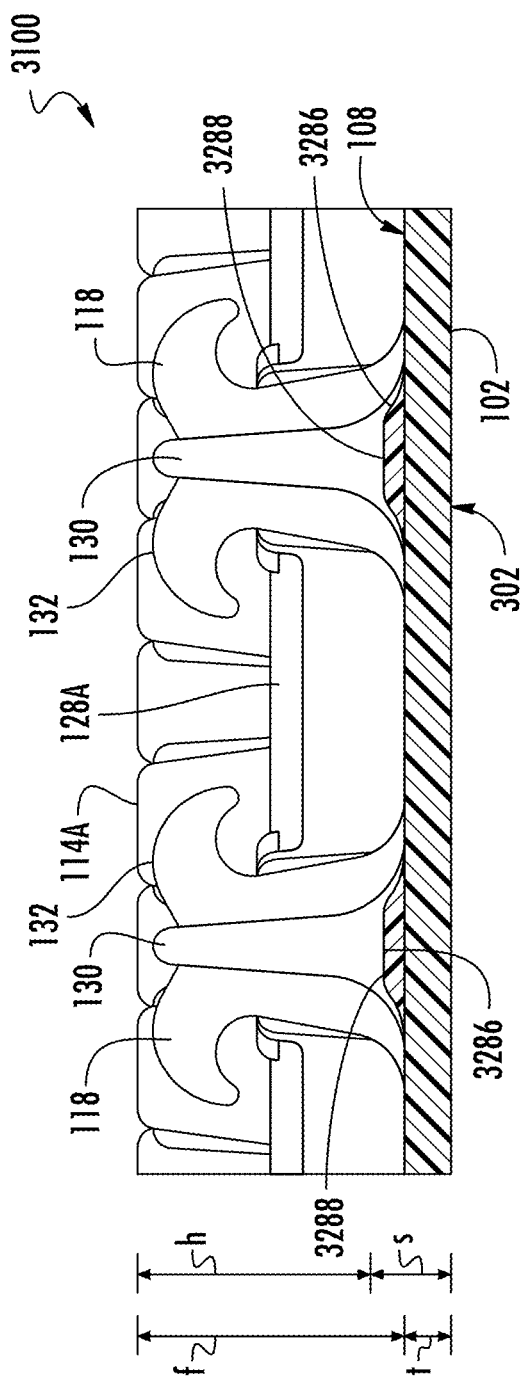
FIG. 34 is a sectional view of the segment of fastening tape of FIG. 31 taken along line 34-34 in FIG. 33A.
Figure 35:
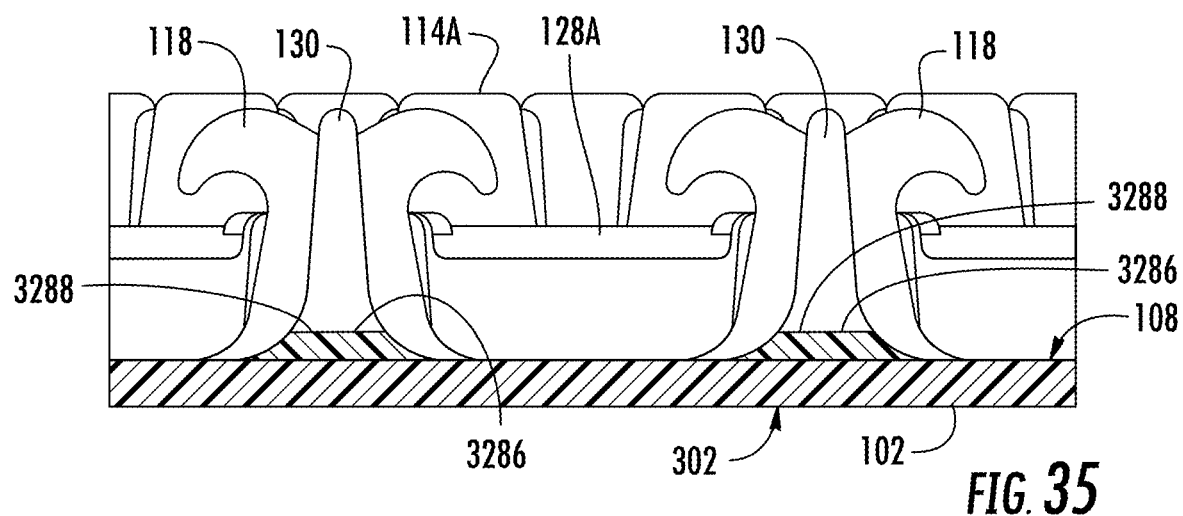
FIG. 35 is a sectional view of a segment of fastening tape according to an aspect of the current disclosure.

The ribs 3286 can have any suitable profile and shape. For example and without limitation, FIG. 34 illustrates an example of the ribs 3286 having a first profile and FIG. 35 illustrates another example of the ribs 3286 of a fastening tape 3100A having a second profile. If desired, fastening tape 3100 can include ribs 3286 of various profiles.

Referring to FIGS. 33A, 33B, and 34, as previously described, each fastener 118 has a height f, which is the distance from the topmost end 132 of the fastener 118 to the top surface 108 of the body 102. As illustrated, each slit 136 defines a height h, which is a distance from the topmost end 132 of the fastener 118 to the lowermost extent of the slit 136. The height h of the slit 136 is a value within the range of approximately f±(0.15*f). This range of heights of the slit 136 can help provide a desired amount of flexibility in the fastening tape 3100.

In some aspects, h is greater than or equal to about f−0.15f (or about 0.85f) and less than or equal to about f+0.15f (or about 1.15f). In this aspect, the lowermost extent of the slit 136 can be at various positions above, below, or at the top surface 108. As one non-limiting example, FIG. 33A illustrates slits 136 at a height h where h is greater than or equal to approximately 0.85f and less than or equal to approximately f. FIG. 33B illustrates another non-limiting example of a fastening tape 3300 that is substantially similar to the fastening tape 3100. However, compared to the fastening tape 3100, in the fastening tape 3300, the slits 136 extend below the top surface 108 of the body 102 to form grooves 3390 in the body 102. In this aspect, each slit 136 has a height h where h is greater than or equal to approximately f and less than or equal to approximately 1.15f. In various other examples, as shown for example in FIG. 3, h can be approximately the same value as f.

Still referring to FIGS. 33A, 33B, and 34, the body 102 defines a thickness t, which is a distance from the top surface 108 to the bottom surface 302 of the body 102. In some examples, the sum of t and f is the overall height of the fastening tape 3100 or 3300. A distance s is the distance from the bottom surface 302 of the body 102 to a lowermost extent of the slit 136. In various examples, the sum of h and s is approximately the same as the sum of t and f.

In some cases, when the distance s is at a maximum value, smax, the height h is at a minimum. When the distance s is at a minimum value, smin, the height h is at a maximum. In this manner, the distance s is inversely related to the height h of the slits 136, and smin≤s≤smax. In some non-limiting examples, smax is less than or equal to approximately t+t and smin is greater than approximately t−t. In this manner, the distance s can be greater than or equal to smin, which is greater than approximately t−t, and can be less than or equal to smax, which is less than or equal to approximately t+t. As one non-limiting example, the distance s can be a value of approximately t+(½)t (or approximately 50% greater than the thickness t of the body 102). In this example, if the thickness t of the base is 0.3 mm, the distance s is 0.3 mm+0.15 mm, or 0.45 mm. In various examples, when s is greater than approximately t, the distance s corresponds to the distance from the bottom surface 302 of the body 102 to the topmost ends 3288 of the ribs 3286. When s is approximately equal to t, the height h corresponds to a distance from the topmost end 134 of the transverse walls 130 to the top surface 108 of the body 102.

Figure 36:
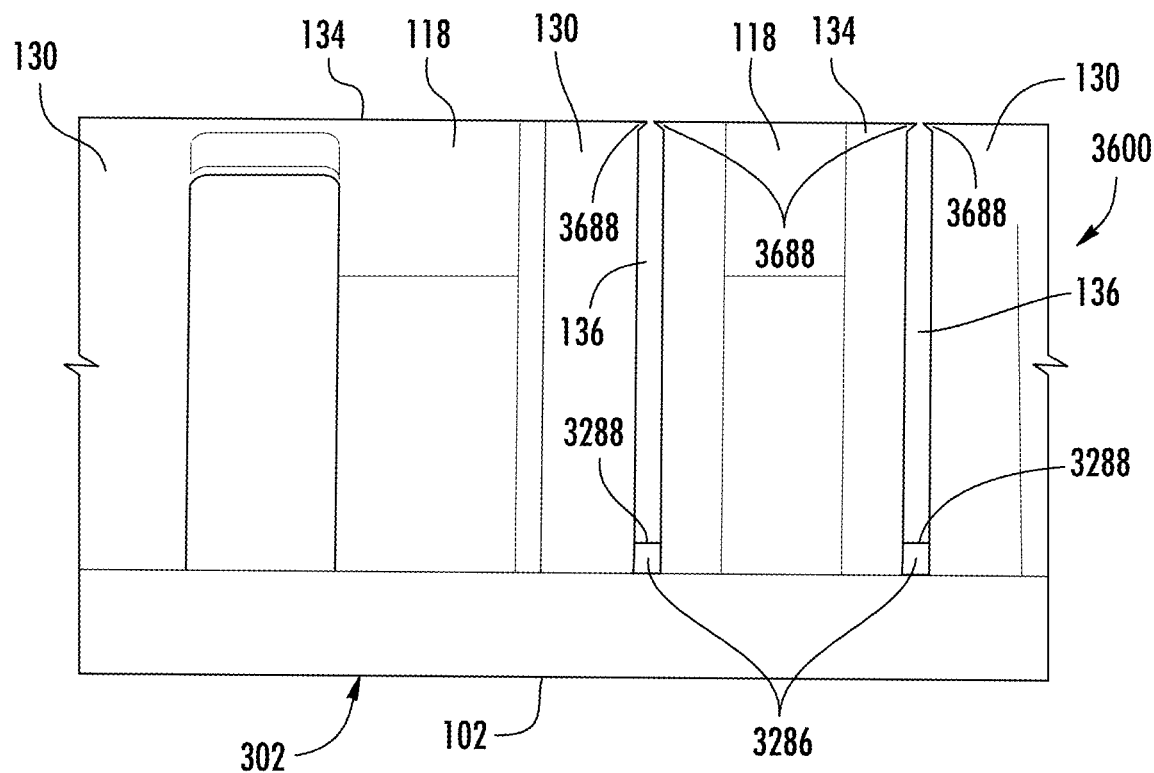
FIG. 36 is an end view of a segment of fastening tape according to an aspect of the current disclosure.
Figure 37:
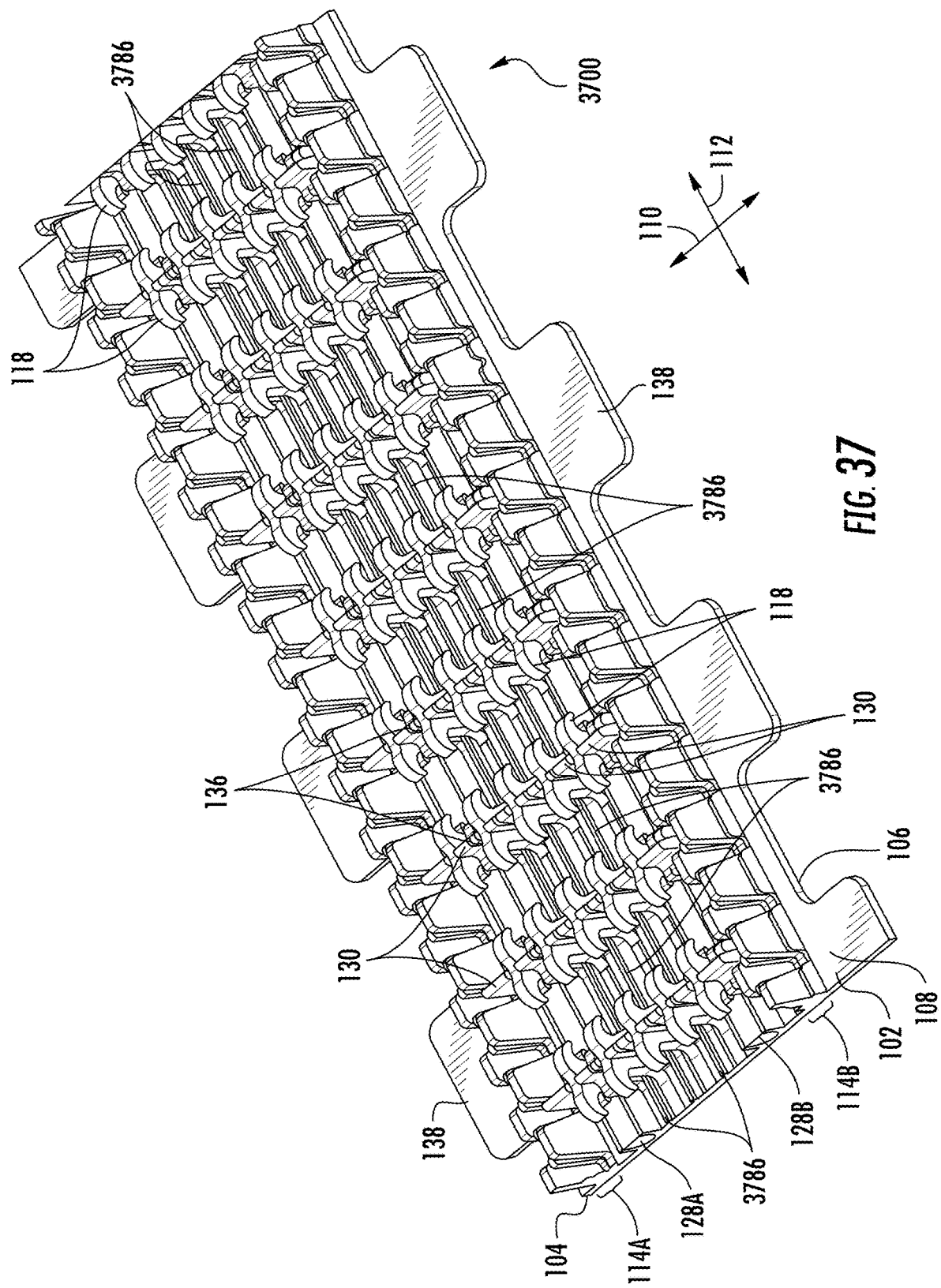
FIG. 37 is a top perspective view of a segment of fastening tape according to an aspect of the current disclosure.
Figure 38:
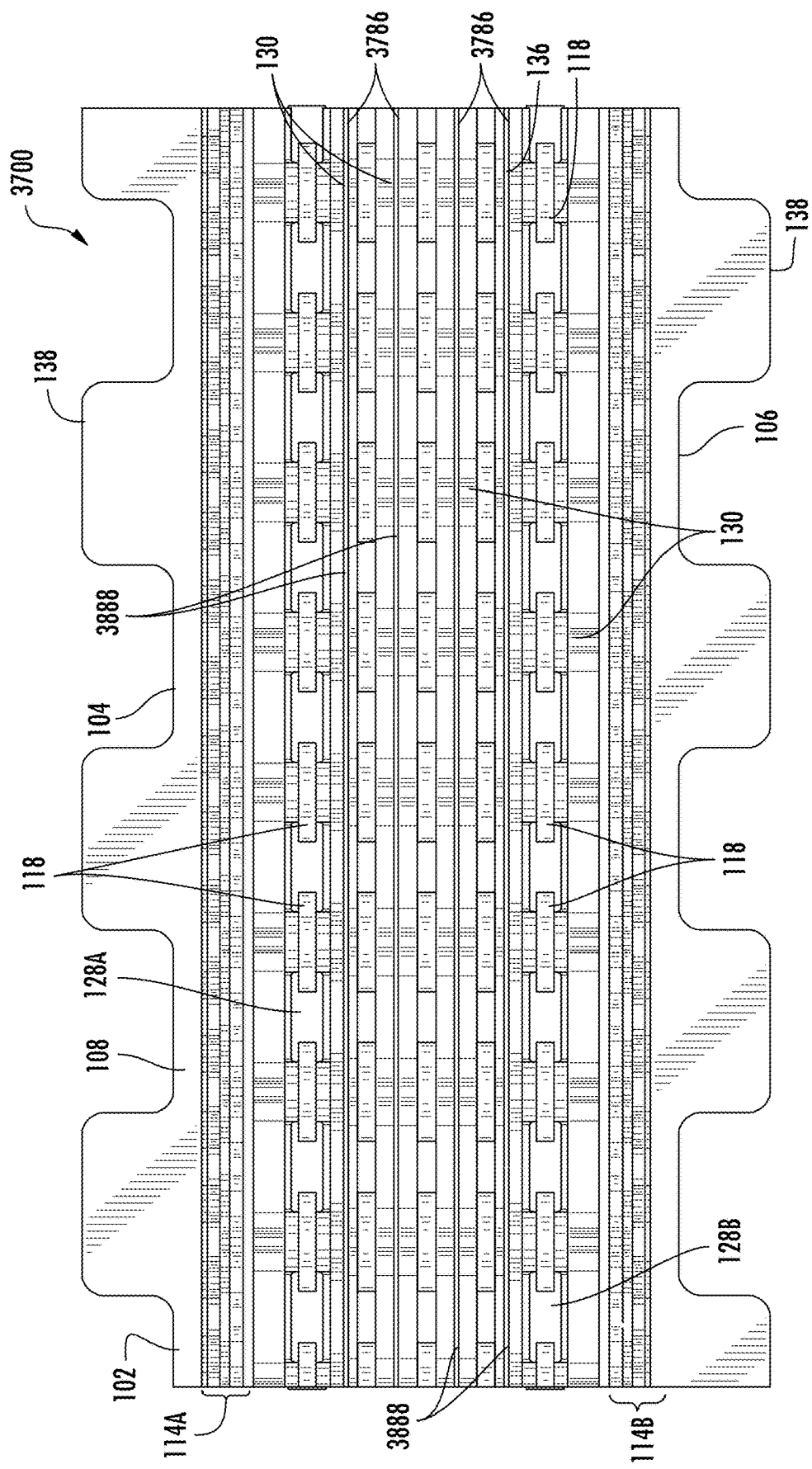
FIG. 38 is a top view of the segment of fastening tape of FIG. 37.
Figure 41:
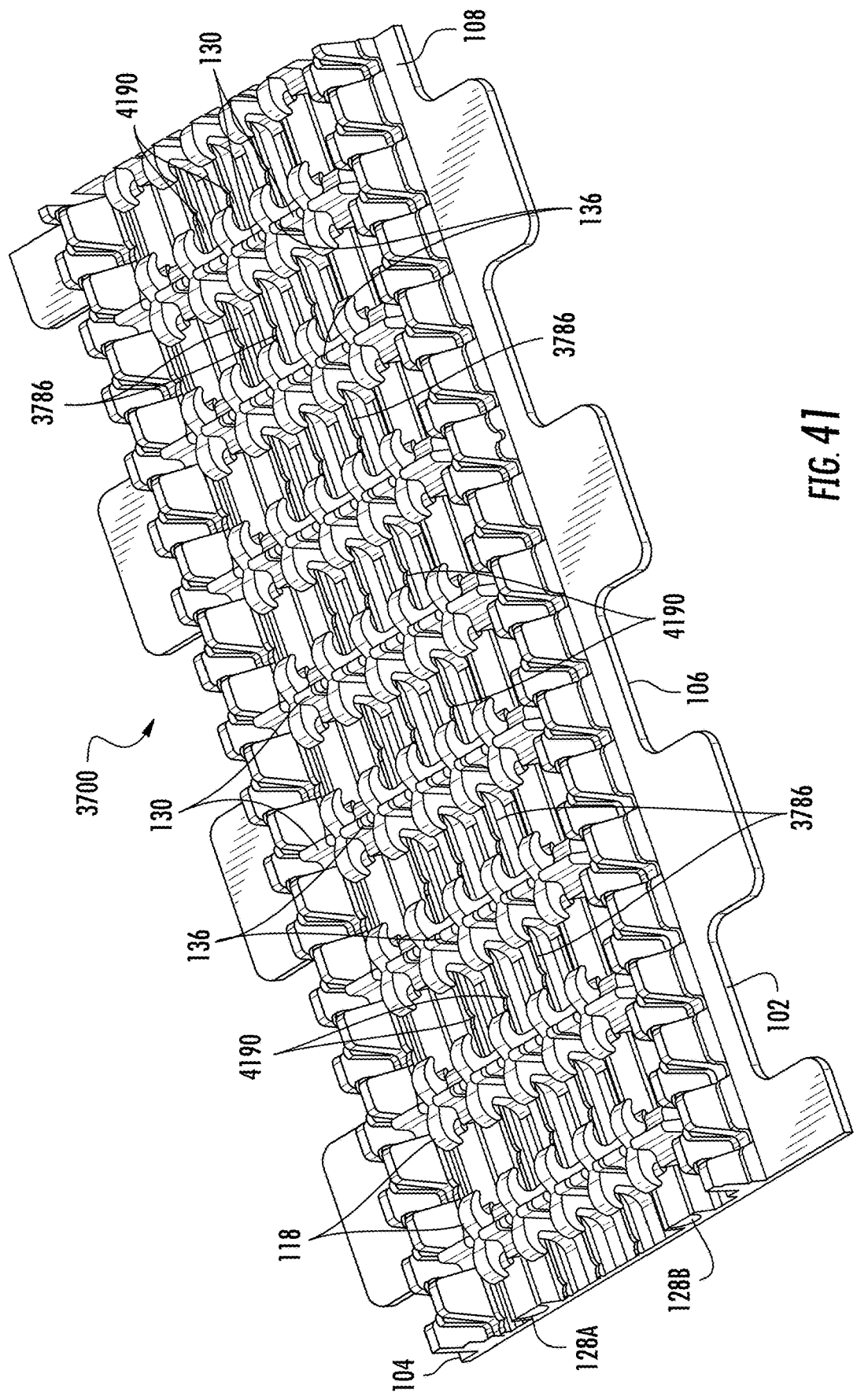
FIG. 41 is a top perspective view of a segment of fastening tape according to an aspect of the current disclosure.
Figure 42:
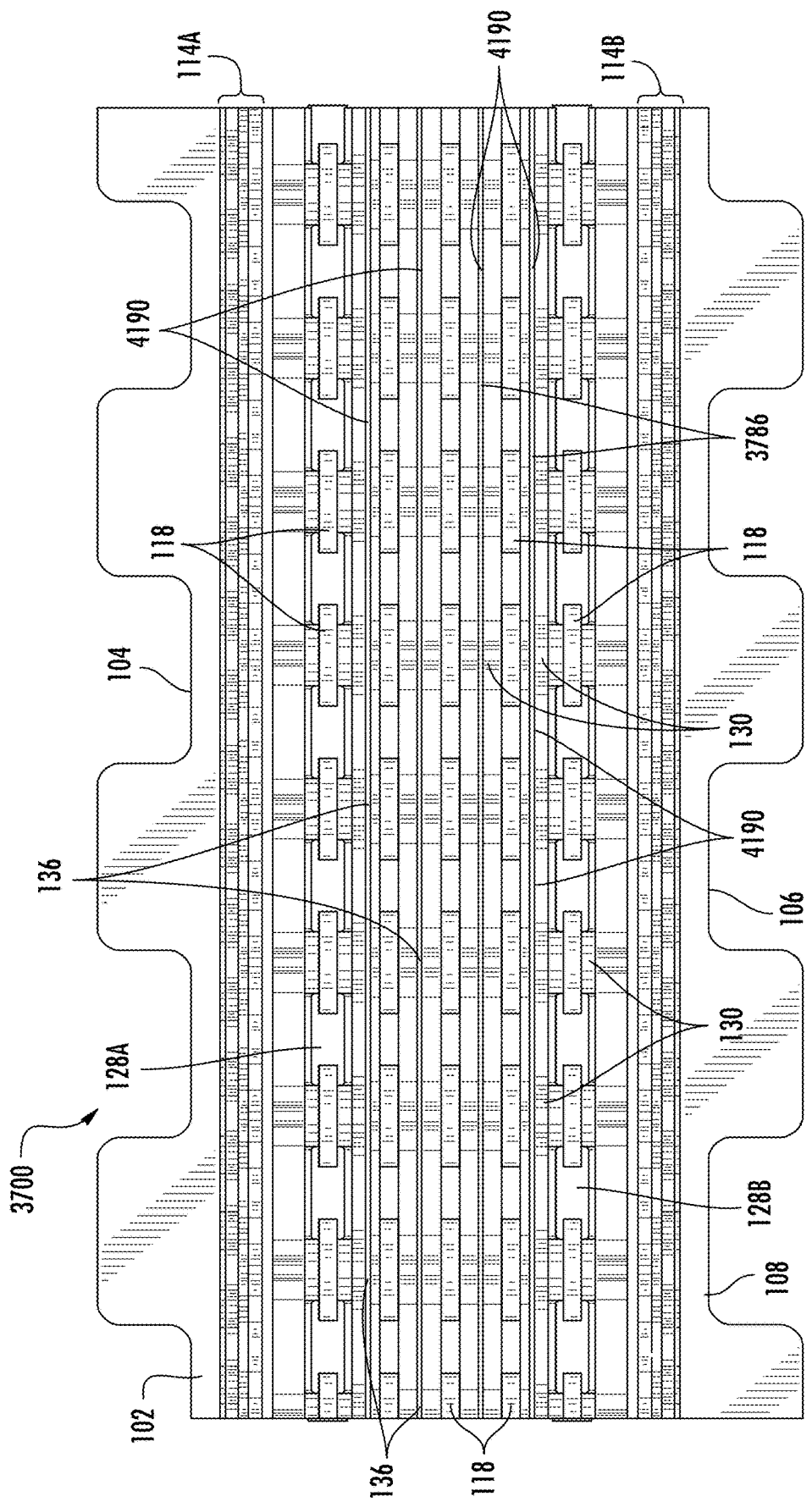
FIG. 42 is a top view of the segment of fastening tape of FIG. 41.
Figure 43:
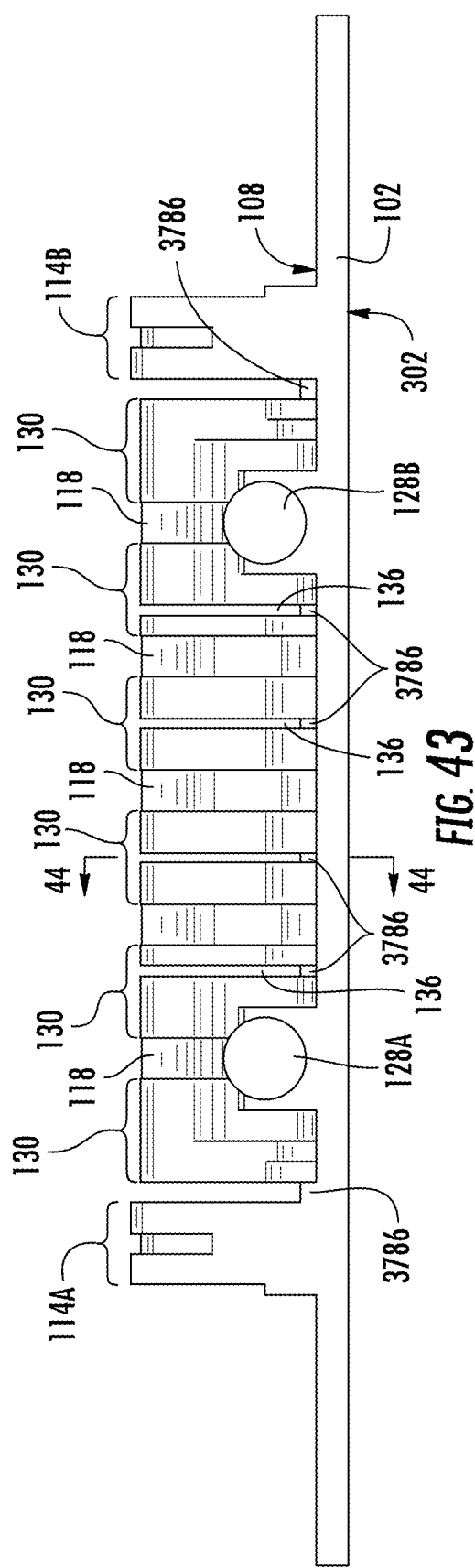
FIG. 43 is an end view of the segment of fastening tape of FIG. 41.
Figure 44:
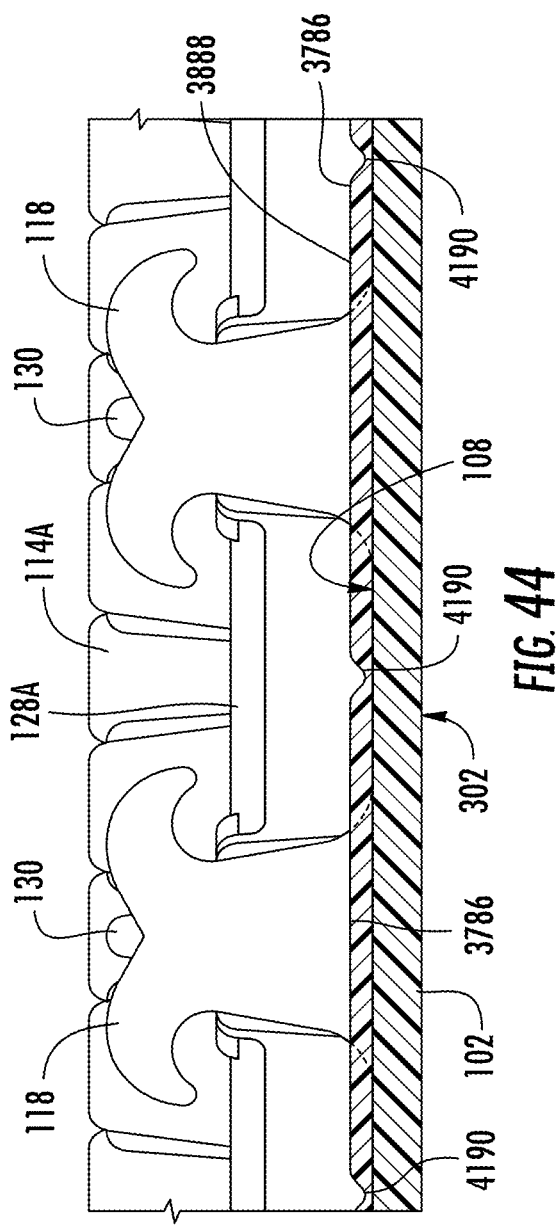
FIG. 44 is a sectional view of the segment of fastening tape of FIG. 41 taken along line 44-44 in FIG. 43.

FIG. 36 illustrates another example of a segment of fastening tape 3600 that is substantially similar to the fastening tape 3100. Compared to the fastening tape 3100, the fastening tape 3600 includes transverse walls 130 having extensions 3688 at the topmost ends 134 that extend into the slits 136. In these examples, the extensions 3688 cause the slits 136 to narrow in width from the topmost end 3288 of the ribs 3286 positioned within the slits 136 to the topmost end 134 of the transverse walls 130. In other examples where the ribs 3286 are omitted, the extensions 3688 cause the slits 136 to narrow in width from the top surface 108 to the topmost end 134, or from the lowermost extent of a groove (such as groove 3390) to the topmost end 134. Extensions 3688 that narrow the slits 136 at the topmost end 134 can help reduce the area through which foam may intrude into the fastening tape 3600.

FIGS. 37-40 illustrate another example of a fastening tape 3700 including ribs 3786. Similar to the ribs 3286, the ribs 3786 can help control the flexibility of the fastening tape 3700. For example, the ribs 3786 may prevent the fastening tape 3100 from being too flexible for a user's intended application while providing an appropriate amount of flexibility for that application. As illustrated in FIGS. 37-40, compared to the fastening tape 3100 with the ribs 3286 extending in the lateral direction 110, the ribs 3786 of the fastening tape 3700 extend in the longitudinal direction 112. In one aspect, the ribs 3786 can extend continuously in the longitudinal direction 112; however, alternatively, the ribs 3786 can define segments extending in the longitudinal direction 112. Similar to the ribs 3286, the ribs 3786 extend in the upward direction from the top surface 108 of the body 102 to a topmost end 3888.

A profile of the ribs 3786 may vary. As one non-limiting example, FIG. 40 illustrates an example of the ribs 3786 having a first profile where the topmost end 3888 is substantially level. FIGS. 41-44 illustrate another non-limiting example of the ribs 3786 defining valleys 4190. As mentioned, the profile of ribs 3286 can be modified as desired, and a fastening tape may include ribs of various shaped profiles.

Figure 45:
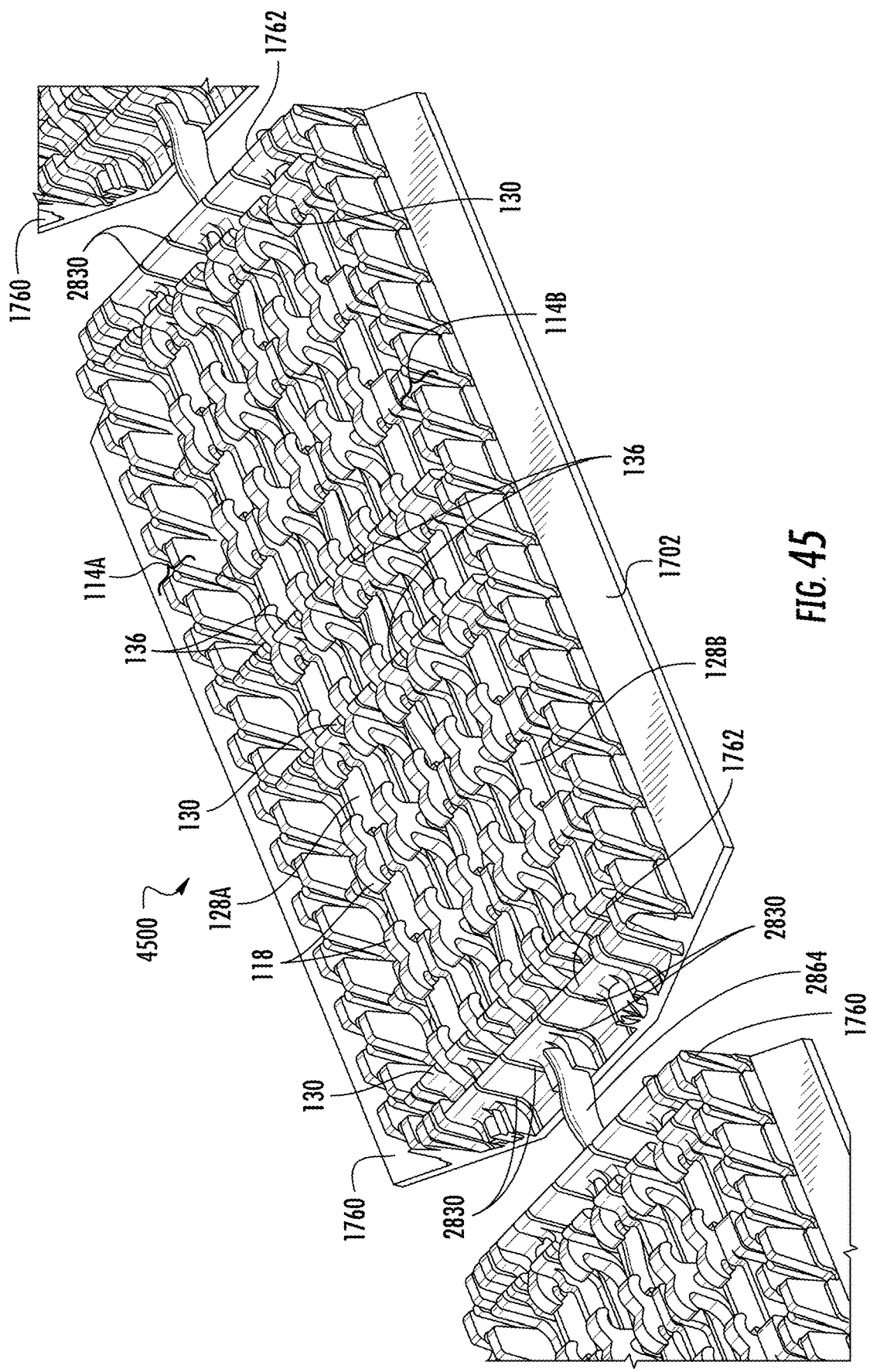
FIG. 45 is a top perspective view of joined segments of fastening tape according to an aspect of the current disclosure.
Figure 46:
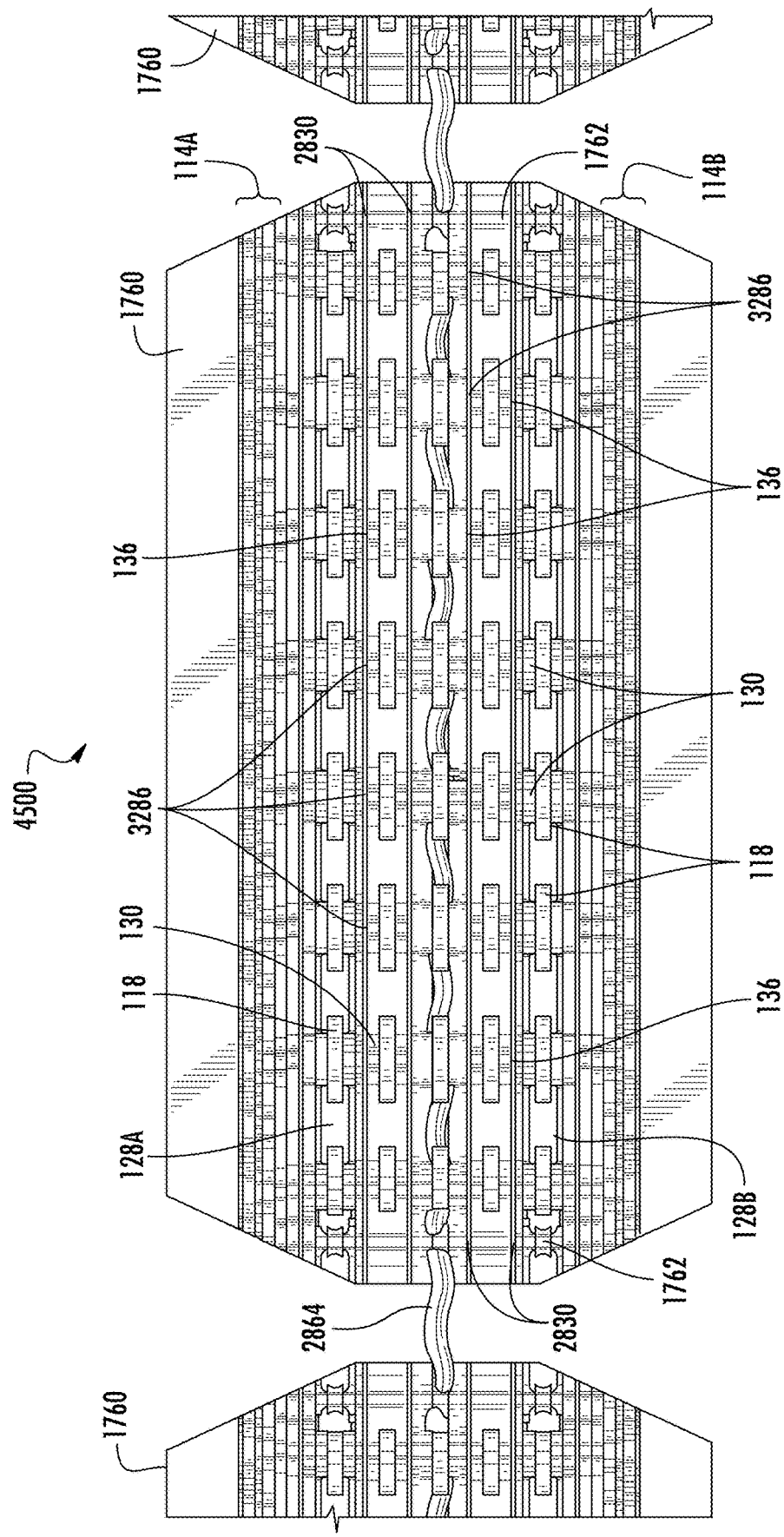
FIG. 46 is a top view of the joined segments of fastening tape of FIG. 45.
Figure 47:
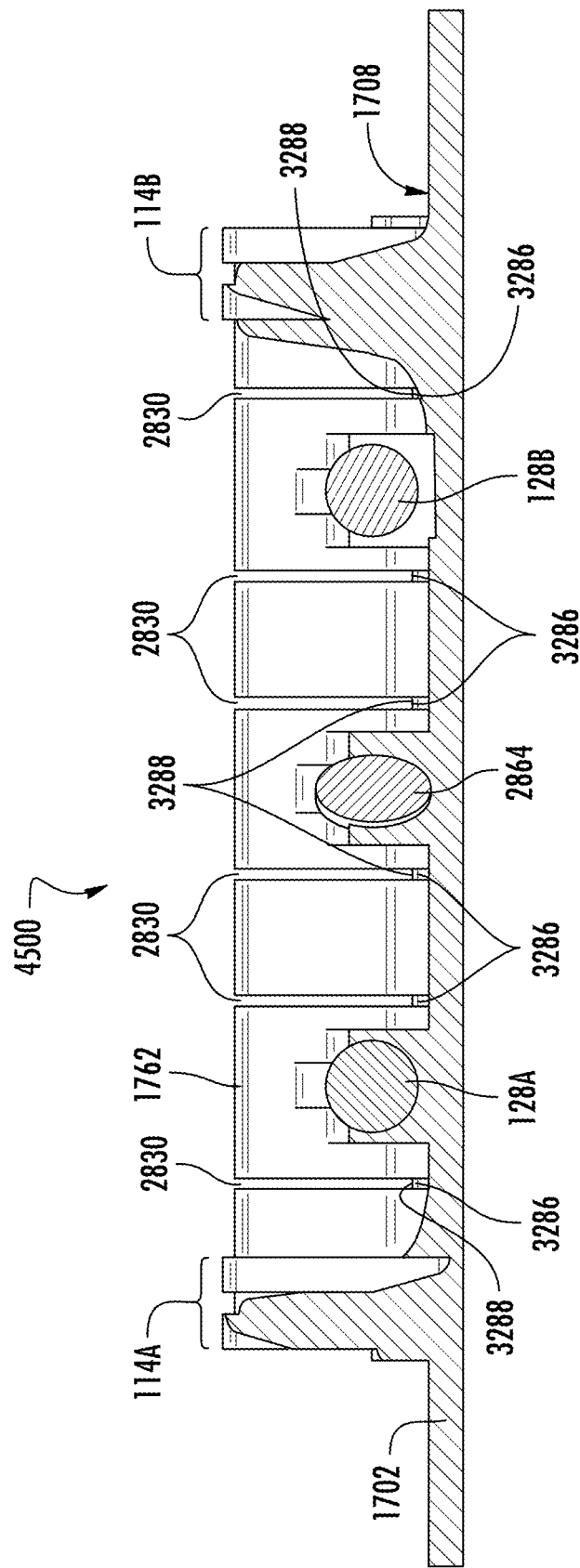
FIG. 47 is an end view of the joined segments of fastening tape of FIG. 45.

FIGS. 45-47 illustrate another example of a fastening tape 4500 that includes the components of the fastening tape 2800 and additionally the ribs 3286 of the fastening tape 3100 extending in the lateral direction 110.

Figure 48:
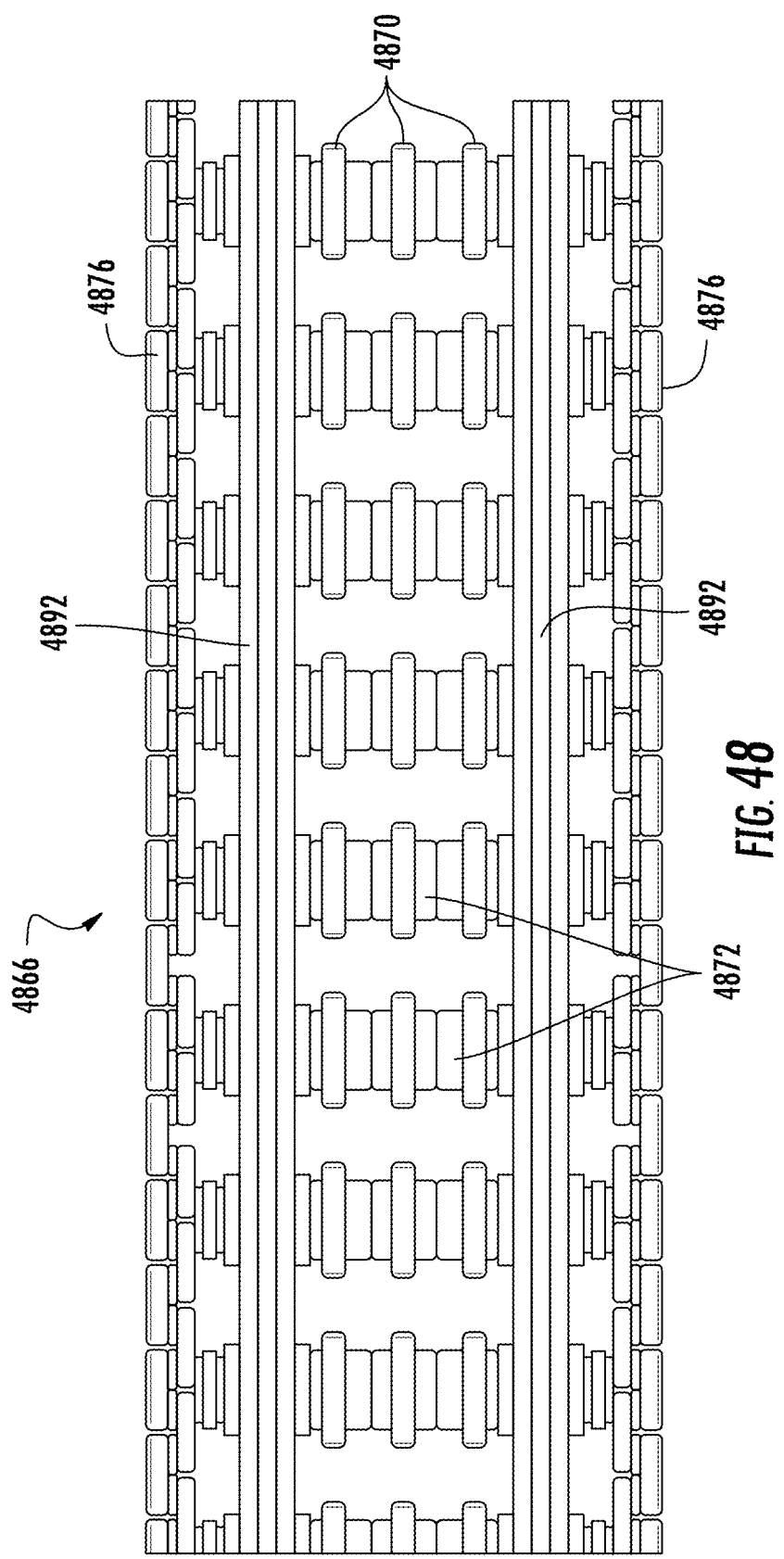
FIG. 48 is a front view of a model of an exemplary die wheel used to form the fastening tape of FIG. 22 according to an aspect of the current disclosure.

FIG. 48 illustrates an image model of an outer surface 4866 of a die wheel 4968 (illustrated in FIG. 49) used to form the fastening tape 2200 as described herein. FIG. 48 is simply a representation of the outer surface 4866 for illustration purposes. The die wheel 4968 is cylindrical in shape and the outer surface 4866 defines a plurality of fastener-shaped cavities 4870 for forming the fasteners 118. In one aspect, the fastener-shaped cavities 4870 are hook-shaped cavities. As illustrated in FIG. 48, in some aspects, the outer surface 4866 of the die wheel 4968 also defines a plurality of cavities 4872 for forming the transverse walls 130 and a plurality of cavities 4876 for forming the sidewalls 114A,B. The outer surface 4866 of the die wheel 4968 also includes cavities 4892 for forming those locations where the magnetic material 128A,B is to be positioned on the fastening tape 2200.

FIG. 49 is a schematic illustrating an exemplary extrusion process for forming the fastening tape 2200 described above. As illustrated in FIG. 49, an extruder 4980 is positioned adjacent a die wheel 4968. The extruder 4980 includes a channel 4982 through which resin that forms the fastening tape 2200 can flow. The channel 4982 is positioned with respect to the outer surface 4866 of the die wheel 4968 such that the resin can flow over the outer surface 4866 of the die wheel 4968. In one aspect, resin is introduced through the channel 4982 at the same time that magnetic material 128 (not illustrated) is also introduced with respect to die wheel 4968 to form the fastening tape 2200. In another aspect, the magnetic material 128 is introduced after the resin is introduced. The die wheel 4968 can rotate as the resin is introduced. The arrangement shown in FIGS. 48 and 49 is exemplary only and modifications can be made to form fastening tapes having other configurations.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive;

and the invention is not limited to these example embodiments but rather encompasses all possible modifications and variations within the scope of the issued claims and their equivalents.

EC 1. A fastening tape comprising: a body comprising a first edge, a second edge distal from the first edge, and a top surface extending between the first edge and the second edge, the body defining a lateral direction from the first edge to the second edge and a longitudinal direction transverse to the lateral direction; a plurality of fasteners extending in an upward direction from the top surface of the body and arranged in rows extending in the lateral direction of the body; a support extending in the upward direction from the top surface of the body and extending in the longitudinal direction, the support comprising a support top surface defining a plurality of plateaus and a plurality of valleys, wherein a height of each of the plurality of plateaus is greater than a height of each of the plurality of valleys; a plurality of transverse walls extending in the upward direction from the top surface of the body, the plurality of transverse walls arranged in rows extending in the lateral direction along the body, wherein some of the plurality of transverse walls connect fasteners of one of the rows of the plurality of fasteners; and a magnetic material positioned on at least a portion of one of the plurality of plateaus or a portion of one of the plurality of valleys of the support top surface.

EC 2. The fastening tape of any of the preceding or subsequent example combinations, wherein the magnetic material is a continuous, notched element positioned on the plurality of plateaus and the plurality of valleys of the support top surface such that a distance from a top surface of the magnetic material to the top surface of the body varies in the longitudinal direction.

EC 3. The fastening tape of any of the preceding or subsequent example combinations, wherein the magnetic material comprises segments on the support top surface that are separate from one another.

EC 4. The fastening tape of any of the preceding or subsequent example combinations, wherein the segments of the magnetic material are positioned on at least some of the plurality of plateaus.

EC 5. The fastening tape of any of the preceding or subsequent example combinations, wherein each plateau of the plurality of plateaus comprises a front-facing portion of the support top surface, an upward-facing portion of the support top surface, and a back-facing portion of the support top surface.

EC 6. The fastening tape of any of the preceding or subsequent example combinations, wherein the magnetic material is positioned on at least one of the front-facing portion of the support top surface, the upward-facing portion of the support top surface, or the back-facing portion of the support top surface of at least one of the plateaus of the plurality of plateaus.

EC 7. The fastening tape of any of the preceding or subsequent example combinations, wherein one of the plurality of plateaus spans one of the rows of the plurality of fasteners.

EC 8. The fastening tape of any of the preceding or subsequent example combinations, wherein one of the plurality of plateaus spans two rows of the plurality of fasteners.

EC 9. The fastening tape of any of the preceding or subsequent example combinations, further comprising: a first sidewall extending in the upward direction from the top surface of the body and positioned between the first edge and the second edge; and a second sidewall extending in the upward direction from the top surface of the body and positioned between the first sidewall and the second edge, wherein the plurality of fasteners, the support, and the plurality of transverse walls are positioned on the top surface of the body between the first sidewall and the second sidewall.

EC 10. The fastening tape of any of the preceding or subsequent example combinations, wherein at least some of the plurality of transverse walls connect laterally adjacent ones of the plurality of fasteners.

EC 11. The fastening tape of any of the preceding or subsequent example combinations, wherein a slit is between or adjacent at least one of the transverse walls connecting the laterally adjacent ones of the plurality of fasteners, wherein the slit extends from a top end of the at least one transverse wall towards the top surface of the body.

EC 12. A fastening tape comprising: a body comprising a first edge, a second edge distal from the first edge, and a top surface extending between the first edge and the second edge, the body defining a lateral direction from the first edge to the second edge and a longitudinal direction transverse to the lateral direction; a plurality of fasteners extending in an upward direction from the top surface of the body and arranged in rows extending in the lateral direction of the body; a support extending in the upward direction from the top surface of the body and extending in the longitudinal direction, the support comprising a support top surface, wherein the support top surface defines a plurality of plateaus and a plurality of valleys, wherein a height of each of the plurality of plateaus is greater than a height of each of the plurality of valleys; a plurality of transverse walls extending in the upward direction from the top surface of the body, each transverse wall of the plurality of transverse walls extending in the lateral direction of the body and comprising a transverse wall width, wherein at least some of the plurality of transverse walls connect fasteners of the plurality of fasteners; at least one slit within or adjacent at least one of the transverse walls of the plurality of transverse walls, wherein the at least one slit extends from a topmost end of the at least one transverse wall towards the top surface of the body and has a slit width that is less the transverse wall width; and a magnetic material positioned on at least a portion of one of the plurality of plateaus or a portion of one of the plurality of valleys of the support top surface.

EC 13. The fastening tape of any of the preceding or subsequent example combinations, wherein the magnetic material is a continuous, notched element on the support top surface such that a distance from a top surface of the magnetic material to the top surface of the body varies in the longitudinal direction.

EC 14. The fastening tape of any of the preceding or subsequent example combinations, wherein the magnetic material comprises segments on the support top surface that are separate from one another.

EC 15. The fastening tape of any of the preceding or subsequent example combinations, wherein the magnetic material is positioned on at least one of a front-facing portion of the support top surface, an upward-facing portion of the support top surface, or a back-facing portion of the support top surface of at least some of the plateaus of the plurality of plateaus.

EC 16. The fastening tape of any of the preceding or subsequent example combinations, wherein the support is a first support comprising a first support top surface, and wherein the fastening tape further comprises: a first sidewall extending in the upward direction from the top surface of the body between the first edge and the second edge; a second sidewall extending in the upward direction from the top surface of the body between the first sidewall and the second edge; and a second support extending in the upward direction from the top surface of the body and extending in the longitudinal direction, the second support comprising a second support top surface, wherein the plurality of fasteners, the first support, the second support, and the plurality of transverse walls are positioned on the top surface of the body between the first sidewall and the second sidewall, wherein the first support is positioned between the plurality of fasteners and the first sidewall, and wherein the second support is positioned between the plurality of fasteners and the second sidewall.

EC 17. The fastening tape of any of the preceding or subsequent example combinations, wherein the magnetic material is a first magnetic material positioned on the first support top surface, and wherein the fastening tape further comprises a second magnetic material positioned on the second support top surface.

EC 18. A fastening tape comprising: a body comprising a first edge, a second edge distal from the first edge, and a top surface extending between the first edge and the second edge, the body defining a lateral direction from the first edge to the second edge and a longitudinal direction transverse to the lateral direction; a plurality of fasteners extending in an upward direction from the top surface of the body and arranged in rows extending in the lateral direction of the body; a support extending in the upward direction from the top surface of the body and extending in the longitudinal direction, the support comprising a support top surface defining a plurality of plateaus and a plurality of valleys, wherein a height of each of the plurality of plateaus is greater than a height of each of the plurality of valleys; a plurality of transverse walls extending in the upward direction from the top surface of the body, each transverse wall of the plurality of transverse walls extending in the lateral direction of the body, wherein at least some of the plurality of transverse walls connect fasteners of the rows of the plurality of fasteners; at least one slit within or adjacent to one of the plurality of transverse walls, wherein the at least one slit extends from a topmost end of the transverse wall towards the top surface of the body; and a magnetic material positioned on at least a portion of one of the plurality of plateaus or a portion of one of the plurality of valleys of the support top surface.

EC 19. The fastening tape of any of the preceding or subsequent example combinations, wherein each plateau of the plurality of plateaus comprises a front-facing portion of the support top surface, an upward-facing portion of the support top surface, and a back-facing portion of the support top surface.

EC 20. The fastening tape of any of the preceding or subsequent example combinations, wherein the magnetic material comprises segments that are separate from one another, and wherein each of the segments is positioned on at least one of the front-facing portion of the support top surface, the upward-facing portion of the support top surface, or the back-facing portion of the support top surface of at least some of the plateaus of the plurality of plateaus.

EC 21. The fastening tape of any of the preceding or subsequent example combinations, wherein the magnetic material is a continuous, notched element positioned on the plurality of plateaus and the plurality of valleys of the support top surface such that a height of the magnetic material varies in the longitudinal direction relative to the top surface of the body.

EC 22. The fastening tape of any of the preceding or subsequent example combinations, wherein one of the plurality of plateaus spans one of the rows of the plurality of fasteners.

EC 23. The fastening tape of any of the preceding or subsequent example combinations, wherein one of the plurality of plateaus spans two rows of the plurality of fasteners.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are included within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed is:

1. A manufacturing method of a fastening tape, in which molten resin is introduced from an extruder toward a die wheel formed with a plurality of cavities, to mold the fastening tape, the manufacturing method comprising steps of:
   introducing continuous magnetic material between the die wheel and the molten resin;
   securing the magnetic material to the molten resin so as to expose the magnetic material on a surface of the fastener tape, while deforming the magnetic material with a plurality of extensions which are formed on an outer surface of the die wheel; and
   cooling down the molten resin to which the magnetic material is secured, to tear off the cooled resin from the die wheel.

2. The manufacturing method according to claim 1, wherein
   the magnetic material is a linear-shaped magnetic material.

3. The manufacturing method according to claim 1, wherein
   the magnetic material is an iron monofilament formed of a resin containing iron powder.

4. The manufacturing method according to claim 1, wherein
   the extensions are formed so as to cut or notch the magnetic material.

5. The manufacturing method according to claim 4, further comprising a step of:
   cutting the magnetic material into separate pieces by the extensions which are sharp, wherein
   the separate pieces are pushed, by the molten resin introduced from the extruder, to surfaces of the cavities between the extensions.

6. The manufacturing method according to claim 1, wherein
   the magnetic material is formed of a resin having a melting point higher than a melting point of the resin forming the fastening tape.

* * * * *